US012782964B2

(12) United States Patent
Ikenaga

(10) Patent No.: US 12,782,964 B2
(45) Date of Patent: Nov. 3, 2026

(54) DEVICE AND METHOD FOR GENERATING A GUIDE ROUTE FOR GUIDANCE PROVIDED BY A ROBOT

(71) Applicant: SONY GROUP CORPORATION, Tokyo (JP)

(72) Inventor: Mari Ikenaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 23 days.

(21) Appl. No.: 18/868,767

(22) PCT Filed: Apr. 7, 2023

(86) PCT No.: PCT/JP2023/014448
§ 371 (c)(1),
(2) Date: Nov. 24, 2024

(87) PCT Pub. No.: WO2023/233822
PCT Pub. Date: Dec. 7, 2023

(65) Prior Publication Data

US 2025/0321592 A1 Oct. 16, 2025

(30) Foreign Application Priority Data

May 30, 2022 (JP) ............................ JP2022-087456

(51) Int. Cl.
*G05D 1/646* (2024.01)
*G05D 1/644* (2024.01)
(Continued)

(52) U.S. Cl.
CPC ............ *G05D 1/646* (2024.01); *G05D 1/644* (2024.01); *G05D 2105/315* (2024.01); *G05D 2107/60* (2024.01); *G05D 2109/10* (2024.01)

(58) Field of Classification Search
CPC .. G05D 1/646; G05D 1/644; G05D 2105/315; G05D 2107/60; G05D 2109/10
(Continued)

(56) References Cited

U.S. PATENT DOCUMENTS

2022/0171392 A1* 6/2022 Park .................... G05D 1/0088

FOREIGN PATENT DOCUMENTS

JP 2007205946 A * 8/2007
JP 2008-084135 A 4/2008
(Continued)

OTHER PUBLICATIONS

International Search Report and Written Opinion of PCT Application No. PCT/JP2023/014448, issued on Jun. 20, 2023, 09 pages of ISRWO.

*Primary Examiner* — Isaac G Smith
(74) *Attorney, Agent, or Firm* — CHIP LAW GROUP

(57) ABSTRACT

An information processing device and a method that efficiently create a guide route satisfying route conditions entered by a user are provided. A guide route creation unit is provided to create a guide route for guidance provided by a robot, the guide route being constituted of a plurality of nodes and paths connecting the nodes. The guide route creation unit retrieves node attributes such as a value, an evaluation value, a guidance time, and a guidance target that are set for the nodes respectively in a guidance route creation region, and path attributes such as a distance of each path and a moving time, and creates a guide route satisfying the route conditions entered by the user on a basis of the retrieved node attributes and path attributes.

15 Claims, 28 Drawing Sheets

(51) Int. Cl.
*G05D 105/30* (2024.01)
*G05D 107/60* (2024.01)
*G05D 109/10* (2024.01)

(58) Field of Classification Search
USPC ........................................................... 701/25
See application file for complete search history.

(56) References Cited

FOREIGN PATENT DOCUMENTS

| | | | | | |
|---|---|---|---|---|---|
| JP | 2010049374 | A | * | 3/2010 | |
| JP | 5040186 | B | | 10/2012 | |
| KR | 20210099352 | A | * | 8/2021 | ............. G06Q 50/14 |

* cited by examiner

FIG. 6

131

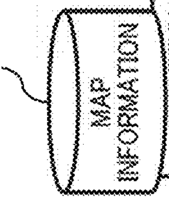

| REGION INFORMATION | | GUIDE SPOT INFORAMTION | | |
|---|---|---|---|---|
| REGION IDENTIFIER | REGION POSITION INFORMATION | GUIDE SPOT IDENTIFIER | GUIDE SPOT EXHIBIT | GUIDE SPOT POSITION |
| REGION A | POSITION INFORMATION ABOUT REGION A | a1 | EXHIBIT A | POSITION INFORMATION ON a1 |
| | | a2 | EXHIBIT B | POSITION INFORMATION ON a2 |
| REGION B | POSITION INFORMATION ABOUT REGION B | b1 | EXHIBIT C | POSITION INFORMATION ON b1 |
| | | b2 | EXHIBIT D | POSITION INFORMATION ON b2 |
| : | : | : | : | : |

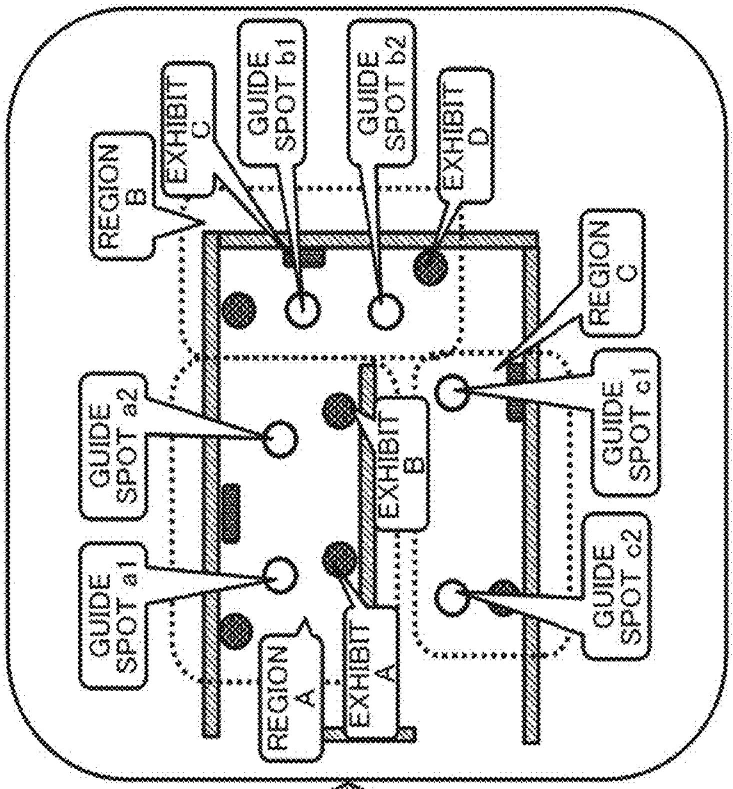

132 EXHIBITION CONTENT INFORMATION

| REGION IDENTIFIER | REGION EXHITION CONTENTS | GUIDE SPOT IDENTIFIER | GUIDE SPOT EXHIBIT | GUIDANCE TIME (EXHIBITION CONTENT GUIDANCE TIME) |
|---|---|---|---|---|
| REGION A | 1800S–ERA WORK | a1 | EXHIBIT A | 5 MIN. |
| | | a2 | EXHIBIT B | 10 MIN. |
| REGION B | 1900S–ERA WORK | b1 | EXHIBIT C | 2 MIN. |
| | | b2 | EXHIBIT D | 4 MIN. |
| : | : | : | : | : |

FIG. 7A

133 REGION-SPECIFIC SCHEDULE INFORMATION

| REGION IDENTIFIER | AVAILABILITY SCHEDULE | FEE |
|---|---|---|
| REGION A | AVAILABLE ALL DAY | REGULAR FEE (300 YEN) |
| REGION B | AVAILABLE ONLY ON WEEKEND | SPECIAL FEE (500 YEN) |
| : | : | : |

FIG. 7B

FIG. 11

121

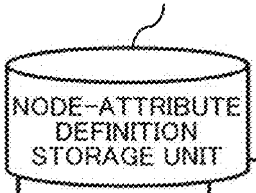

| NODE ATTRIBUTE ID (attribute ID) | NODE ATTRIBUTE NAME | NODE ATTRIBUTE TYPE (NUMERIC VALUE, TRUTH VALUE, EVALUATION, USER DEFINITION, PERIOD) | UNIT (ATTRIBUTE TYPE IS NUMERIC VALUE) | LEVEL (ATTRIBUTE TYPE IS EVALUATION) | USER DEFINITION TYPE (ATTRIBUTE TYPE IS USER DEFINITION) |
|---|---|---|---|---|---|
| NODE ATTRIBUTE 01 (n_attr_01) | CHARGE FOR NODE GUIDANCE | NUMERIC VALUE | YEN | | |
| NODE ATTRIBUTE 02 (n_attr_02) | MEAN STAY TIME AT NODE | NUMERIC VALUE | MINUTE | | |
| NODE ATTRIBUTE 03 (n_attr_03) | VALUE OF EXHIBIT AT NODE | EVALUATION | | 10 SCALE | |
| NODE ATTRIBUTE 04 (n_attr_04) | SATISFACTION LEVEL DURING STAY AT NODE | EVALUATION | | 5 SCALE | |
| NODE ATTRIBUTE 05 (n_attr_05) | PERSON (INSIDE OR OUTSIDE) TO BE GUIDED TO NODE | USER DEFINITION | | | ANY, STAFF MEMBER, GUEST |
| NODE ATTRIBUTE 06 (n_attr_06) | PERSON TO BE GUIDED TO NODE (SEX) | USER DEFINITION | | | ANY, MAN, WOMAN, NON-RESPONSE |
| NODE ATTRIBUTE 07 (n_attr_07) | NODE UNAVAILABILITY PERIOD | PERIOD | | | |
| NODE ATTRIBUTE 08 (n_attr_08) | NODE AVAILABILITY PERIOD LIMITED TO STAFF MEMBER | PERIOD | | | |
| : | | | | | |

FIG. 12

122

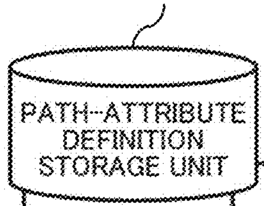

| PATH ATTRIBUTE ID (attribute ID) | PATH ATTRIBUTE NAME | PATH ATTRIBUTE TYPE (NUMERIC VALUE, TRUTH VALUE, EVALUATION, USER DEFINITION) | UNIT (ATTRIBUTE TYPE IS NUMERIC VALUE) | LEVEL (ATTRIBUTE TYPE IS EVALUATION) | USER DEFINITION TYPE (ATTRIBUTE TYPE IS USER DEFINITION) |
|---|---|---|---|---|---|
| PATH ATTRIBUTE 01 (p_attr_01) | DISTANCE OF PATH | NUMERIC VALUE | m | | |
| PATH ATTRIBUTE 02 (p_attr_02) | MOVING TIME OF PATH | NUMERIC VALUE | SECOND | | |
| PATH ATTRIBUTE 03 (p_attr_03) | IF BABY BUGGY AND WHEELCHAIR ARE USABLE OR NOT ON PATH | TRUTH VALUE | | | |
| ⋮ | | | | | |

FIG. 13

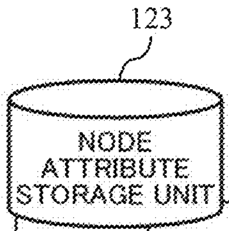

| NODE ID (node ID) | NODE NAME (Node name) | NODE ATTRIBUTE 01 (CHARGE (YEN)) | NODE ATTRIBUTE 02 (STAY TIME (MINUTE)) | NODE ATTRIBUTE 03 (VALUE OF EXHIBIT) | NODE ATTRIBUTE 04 (SATISFACTION LEVEL) | NODE ATTRIBUTE 05 (PERSON (INSIDE OR OUTSIDE) TO BE GUIDED) | NODE ATTRIBUTE 06 (PERSON TO BE GUIDED TO NODE (SEX)) | NODE ATTRIBUTE 07 (UNAVAILABILITY PERIOD) | NODE ATTRIBUTE 08 (AVAILABILITY PERIOD LIMITED TO STAFF MEMBER) | ... |
|---|---|---|---|---|---|---|---|---|---|---|
| NODE A (node_A) | EXHIBIT A | 300 | 5 | 10 | 4 | GUEST | Any | | | |
| NODE B (node_B) | EXHIBIT B | 50 | 1 | 3 | 2 | INSIDE | Any | | 2022/1/x~ 2022/12/y | |
| NODE C (node_C) | EXHIBIT C | 100 | 8 | 5 | 5 | Any | Any | 2022/2/x~ 2022/3/y | | |
| NODE D (node_D) | EXHIBIT D | 500 | 3 | 7 | 4 | Any | WOMAN | | | |
| : | | | | | | | | | | |

FIG. 14

124

PATH ATTRIBUTE STORAGE UNIT

| PATH ID (path ID) | PATH NAME (path name) | PATH ATTRIBUTE 01 (DISTANCE (m)) | PATH ATTRIBUTE 02 (MOVING TIME (SECOND)) | PATH ATTRIBUTE 03 (BABY BUGGY, WHEELCHAIR) | ... |
| --- | --- | --- | --- | --- | --- |
| PATH AB (path_AB) | Path AB | 2.5 | 3 | YES | |
| PATH BC (path_BC) | Path BC | 3.0 | 5 | YES | |
| PATH CD (path_CD) | Path CD | 3.0 | 5 | YES | |
| PATH BD (path_BD) | Path BD | 4.0 | 6 | NO | |
| : | | | | | |

FIG. 22

NODE ATTRIBUTE SETTING

"SATISFACTION LEVEL OF NODE" MAY BE AUTOMATICALLY CALCULATED BY COLLECTING THE QUESTIONNAIRE SURVEY RESULTS OF USERS OR SENSING INFORMATION ABOUT FACIAL EXPRESSIONS

| NODE ID (node ID) NODE NAME | NODE NAME (Node name) EXHIBIT | NODE ATTRIBUTE 01 GUIDANCE FEE | NODE ATTRIBUTE 02 NODE STAY TIME (AVERAGE) | NODE ATTRIBUTE 03 VALUE OF EXHIBIT | NODE ATTRIBUTE 04 NODE SATISFACTION LEVEL | NODE ATTRIBUTE 05 PERSON (INSIDE AND OUTSIDE) TO BE GUIDED | NODE ATTRIBUTE 06 PERSON TO BE GUIDED (SEX) | NODE ATTRIBUTE 07 UNAVAILABILITY TIME | · · |
|---|---|---|---|---|---|---|---|---|---|
| NODE A | EXHIBIT A | 300 YEN | 5 MIN. | 10/10 | 4/5 | GUEST | Any | — | |
| NODE B | EXHIBIT B | 50 YEN | 1 MIN. | 3/10 | 2/5 | INSIDE | Any | 2022/2/2— 2022/2/28 | |
| NODE C | EXHIBIT C | 100 YEN | 8 MIN. | DATA ENTRY | | | | | |
| NODE D | EXHIBIT D | | | | | | | | |
| | | | | | | | | | |

"VALUE OF EXHIBIT" MAY BE AUTOMATICALLY CALCULATED ON THE BASIS OF "SATISFACTION LEVEL OF NODE. IF THE SATISFACTION LEVEL OF THE NODE IS CHANGED IN RESPONSE TO USER FEEDBACK, "VALUE OF EXHIBIT" IS CHANGED ACCORDINGLY. FOR EXAMPLE, IN THE CREATION OF A GUIDE ROUTE OF EQUAL VALUE, THE ROUTE IS CHANGED ACCORDING TO THE CHANGE OF VALUE.

DEVICE AND METHOD FOR GENERATING A GUIDE ROUTE FOR GUIDANCE PROVIDED BY A ROBOT

CROSS REFERENCE TO RELATED APPLICATIONS

This application is a U.S. National Phase of International Patent Application No. PCT/JP2023/014448 filed on Apr. 7, 2023, which claims priority benefit of Japanese Patent Application No. 2022-087456 filed in the Japan Patent Office on May 30, 2022. Each of the above-referenced applications is hereby incorporated herein by reference in its entirety.

TECHNICAL FIELD

The present disclosure relates to an information processing device, an information processing method, and a program. More particularly, the present disclosure relates to an image processing device, an image processing method, and a program that perform processing for generating a guide route, that is, a route for guidance provided by a traveling guide robot.

BACKGROUND ART

Robots have been used in various places these days.

For example, the use of guide robots to provide guidance to visitors is increasing at art galleries, museums, or stores such as shopping centers.

Guide robots at art galleries and museums have simple conversations with visitors and explain exhibits of the art galleries and museums. Furthermore, guide robots at shopping centers and the like provide customers with guidance on the various sales areas of the shopping centers.

Such guide robots are broadly classified into two types: stationary robots that are fixed at, for example, entrances and only engage in conversations such as answering visitors' questions without moving; and mobile robots that provide guidance while moving around art galleries, museums, or shopping centers, together with visitors.

For example, PTL 1 (JP 5040186 B) discloses a conventional technique related to a mobile guide robot.

PTL 1 discloses a guide robot that provides guidance on a shop. Specifically, PTL 1 discloses a robot that guides a customer while traveling along an optimal route according to a shopping list presented by the customer.

However, the layout of, for example, sales floors in a shopping center is frequently changed. Exhibits and other items in museums and galleries are also frequently replaced and rearranged. With such layout changes, a guide route traveled by the guide robot also needs to be changed.

Furthermore, art galleries or museums may temporarily have special exhibition sections with extra charges. Also in such cases, a guide route needs to be changed according to the desired route and desired charge of a visitor.

In such a guide route change, multiple routes that reflect new layout data and charges or the like need to be created. In a specific example of processing, an operator may confirm new layouts and pricing settings and create a new route based on the new layouts and pricing settings. Unfortunately, such a process of generating a new route based on confirmation from an operator may increase time and cost, and also increase the risk of generating an incorrect route.

CITATION LIST

Patent Literature

[PTL 1]
JP 5040186 B

SUMMARY

Technical Problem

The present disclosure has been made in view of the above-mentioned problem. An object of the present disclosure is to provide an information processing device, an information processing method, and a program that enable the generation of an optimal guide route with ease and in a short time even when the layout of an area to be guided by a guide robot or the charge is changed.

Solution to Problem

A first aspect of the present disclosure is an information processing device including a guide route creation unit that creates a guide route for guidance provided by a robot, wherein the guide route is a guide route constituted of a plurality of nodes and paths connecting the nodes, and the guide route creation unit retrieves the node attributes of the nodes and the path attributes of the paths in a guide route creation region, and creates a guide route satisfying predetermined route conditions on the basis of the retrieved node attributes and path attributes.

Furthermore, a second aspect of the present disclosure is an information processing method performed in an information processing device, the information processing device including a guide route creation unit that creates a guide route for guidance provided by a robot, the guide route being a guide route constituted of a plurality of nodes and paths connecting the nodes, the method including, by the guide route creation unit, retrieving the node attributes of the nodes and the path attributes of the paths in a guide route creation region, and creating a guide route satisfying predetermined route conditions on the basis of the retrieved node attributes and path attributes.

Moreover, a third aspect of the present disclosure is a program for causing an information processing device to perform information processing, the information processing device including a guide route creation unit that creates a guide route for guidance provided by a robot, the guide route being a guide route constituted of a plurality of nodes and paths connecting the nodes, wherein the program causes the guide route creation unit to retrieve the node attributes of the nodes and the path attributes of the paths in a guide route creation region, and create a guide route satisfying predetermined route conditions on the basis of the retrieved node attributes and path attributes.

The program of the present disclosure is, for example, a storage medium provided in a computer-readable form or a program that can be provided by a communication medium, the storage medium or the program being provided to an information processing device or a computer system that can execute various program codes, for example. By providing such a program in a computer-readable form, processing according to the program can be realized on an information processing device or a computer system.

Still other objects, features and advantages of the present disclosure will become apparent by more detailed description on the basis of the embodiments of the present disclosure and the accompanying drawings described below. In the present specification, the system is a logical set of configurations of a plurality of devices, and the devices having each configuration are not limited to those in the same housing.

The configuration of an example of the present disclosure achieves an information processing device and a method that efficiently create a guide route satisfying route conditions entered by a user.

Specifically, for example, a guide route creation unit is provided to create a guide route for guidance provided by a robot, the guide route including a plurality of nodes and paths connecting the nodes. The guide route creation unit retrieves node attributes such as a value, an evaluation value, a guidance time, and a guidance target that are set for the nodes in the guidance route creation region, and path attributes such as a distance of each path and a moving time, and creates a guide route satisfying the route conditions entered by the user.

This configuration achieves an information processing device and a method that efficiently create a guide route satisfying the route conditions entered by the user.

Note that the effects described in the present specification are merely exemplary and not limited, and may have additional effects.

BRIEF DESCRIPTION OF DRAWINGS

FIG. 6 is an explanatory drawing illustrating a specific example of map information.

FIGS. 7A and 7B are explanatory drawings showing a specific example of exhibit content information and region-specific schedule information.

FIG. 11 is an explanatory drawing showing an example of stored data of a node-attribute definition storage unit.

FIG. 12 is an explanatory drawing showing an example of stored data of a path-attribute definition storage unit.

FIG. 13 is an explanatory drawing showing an example of node attributes stored in a node attribute storage unit.

FIG. 14 is an explanatory drawing showing an example of path attributes stored in a path attribute storage unit.

FIG. 22 is an explanatory drawing showing a specific example of processing for setting node attributes for respective nodes.

DESCRIPTION OF EMBODIMENTS

Figure 1:
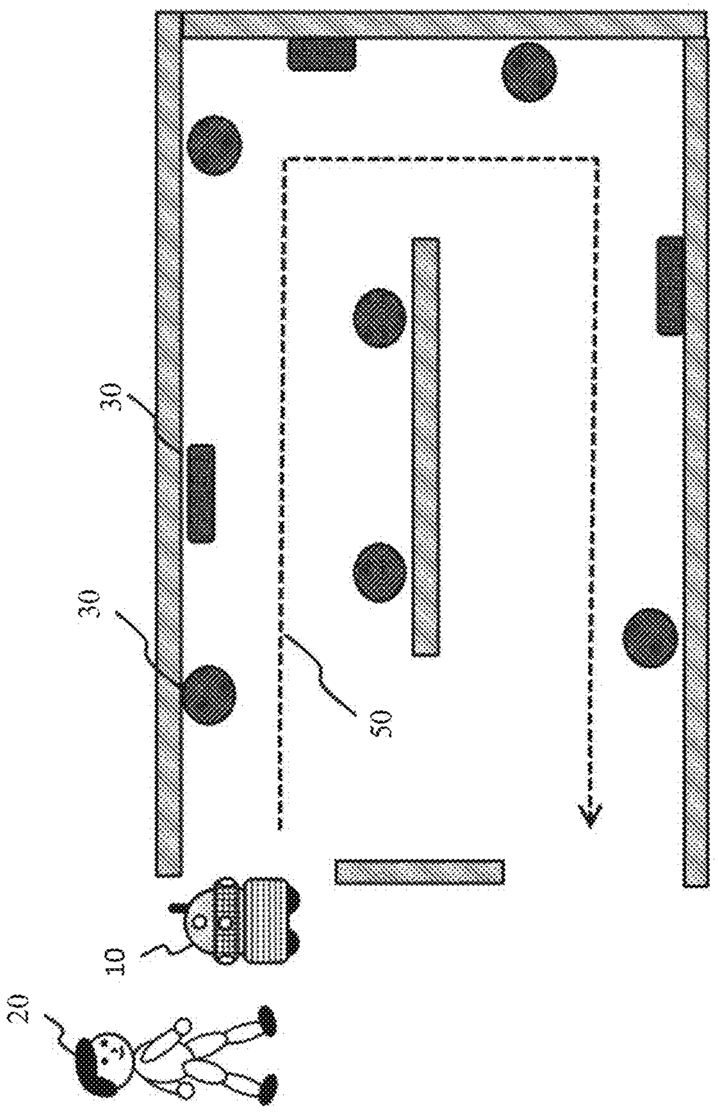
FIG. 1 is an explanatory drawing showing the overview of guidance processing provided by a guide robot.

Hereinafter, the details of an information processing device, an information processing method, and a program of the present disclosure will be described with reference to the drawings. The description will be given according to the following items.

1. Overview of guidance processing by guide robot
2. Overview of configuration and processing of information processing device according to present disclosure
3. Detailed configuration of information processing device according to the present disclosure 4. Specific example of generation and storage processing of node attribute definition information
5. Specific example of node attribute setting processing
6. Specific example of guide route creation processing
7. Sequence of processing performed by information processing device according to present disclosure
8. Hardware configuration example of information processing device
9. Summary of configuration of present disclosure

[1. Overview of Guidance Processing by Guide Robot]

Referring to FIG. 1 and subsequent drawings, the overview of guidance processing by a guide robot will be described below.

For example, the use of guide robots to provide guidance to visitors is increasing at art galleries, museums, or stores such as shopping centers.

Referring to FIG. 1 and subsequent drawings, an example of use of the guide robot will be described below.

The example of FIG. 1 is an example of a robot 10 that provides guidance on an art gallery. The robot 10 moves with a visitor 20 in an art gallery and explains exhibits 30. A guide route 50 in FIG. 1 is a preset guide route. The robot 10 travels according to the guide route 50, stops at each of the exhibits 30, and explains the exhibits 30.

The explanation by the robot 10 is provided by either audio data output processing via a speaker attached to the robot 10, or display data output processing of explanations, still images, or videos via a display (display unit) attached to the robot 10, or a combination thereof.

Figures 2A, 2B, 2C, 2D:
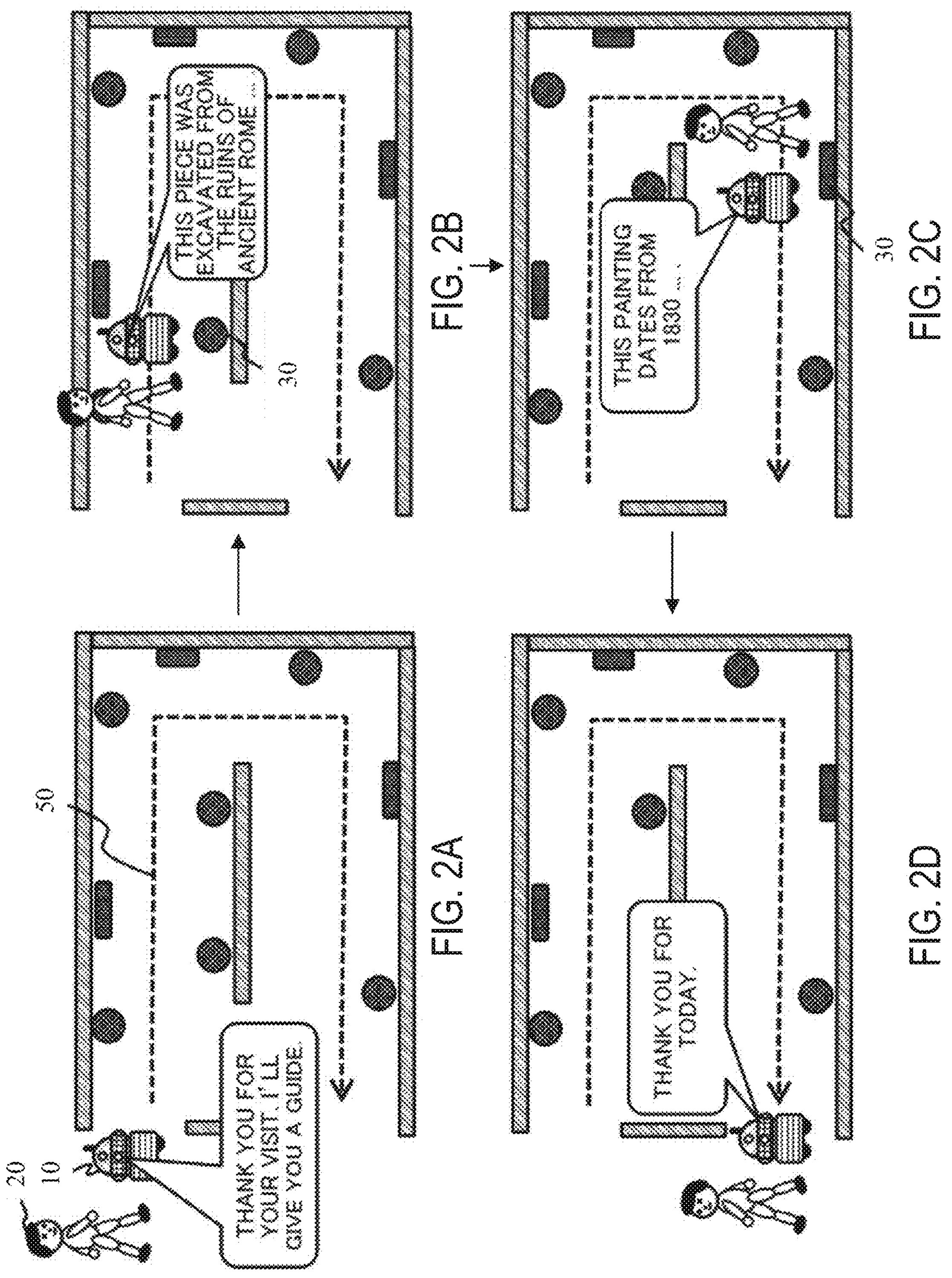
FIGS. 2A-2D are explanatory drawings showing the overview of guidance processing provided by the guide robot.

Referring to FIGS. 2A and 2B, a sequence example of traveling processing and guidance processing by the robot 10 will be described below.

In the example of FIG. 2A, the robot 10 greets the visitor 20 at the entrance of an art gallery. For example, the robot 10 greets the visitor 20 as follows:

"Thank you for your visit. I'll give you a guide."

This greeting is provided by either audio data output processing via a speaker or display data output processing via a display (display unit), or a combination thereof.

After the greeting to the visitor 20, the robot 10 starts traveling according to the preset guide route 50.

In the example of FIG. 2B, the robot 10 stops at one of the exhibits 30 in the art gallery and explains the exhibit 30 to the visitor 20. For example, the robot 10 explains the exhibit 30 to the visitor 20 as follows:

"This piece was excavated from the ruins of ancient Rome . . . ."

This explanation is also provided by either audio data output processing via a speaker or display data output processing via a display (display unit), or a combination thereof. The same applies to the following description.

After the explanation of one exhibit, the robot 10 starts traveling according to the guide route 50, stops at the next exhibit, and provides an explanation about the exhibit.

FIG. 2C illustrates the robot 10 in the process of sequentially explaining the exhibits.

As in FIG. 2B, the robot 10 in FIG. 2C stops at one of the exhibits 30 in the art gallery and explains the exhibit 30 to the visitor 20. For example, the robot 10 explains the exhibit 30 to the visitor 20 as follows:

"This painting dates from 1830 . . . ."

At the completion of explanations about all the exhibits by the robot 10, as illustrated in FIG. 2D, the robot 10 greets the visitor 20 at the exit of the art gallery. For example, the robot 10 greets the visitor 20 as follows:

"Thank you for today."

In this way, simply by following the robot 10, the visitor 20 can view all the exhibits in the art gallery and confirm the explanation of each exhibit through audio data or display data.

For the robot 10, stop positions on the guide route and explanation information to be provided at the stop positions are stored in advance in the storage unit of the robot as program data in addition to the guide route 50. The robot 10 performs traveling, stopping, and speech processing according to the program data stored in the storage unit.

If a change is not made to the layout or exhibits of an art gallery, only a piece of program data can be repeatedly used.

However, layouts and exhibits are frequently changed in reality. In such a case, data on existing guide routes needs to be rewritten.

Figures 3A, 3B:
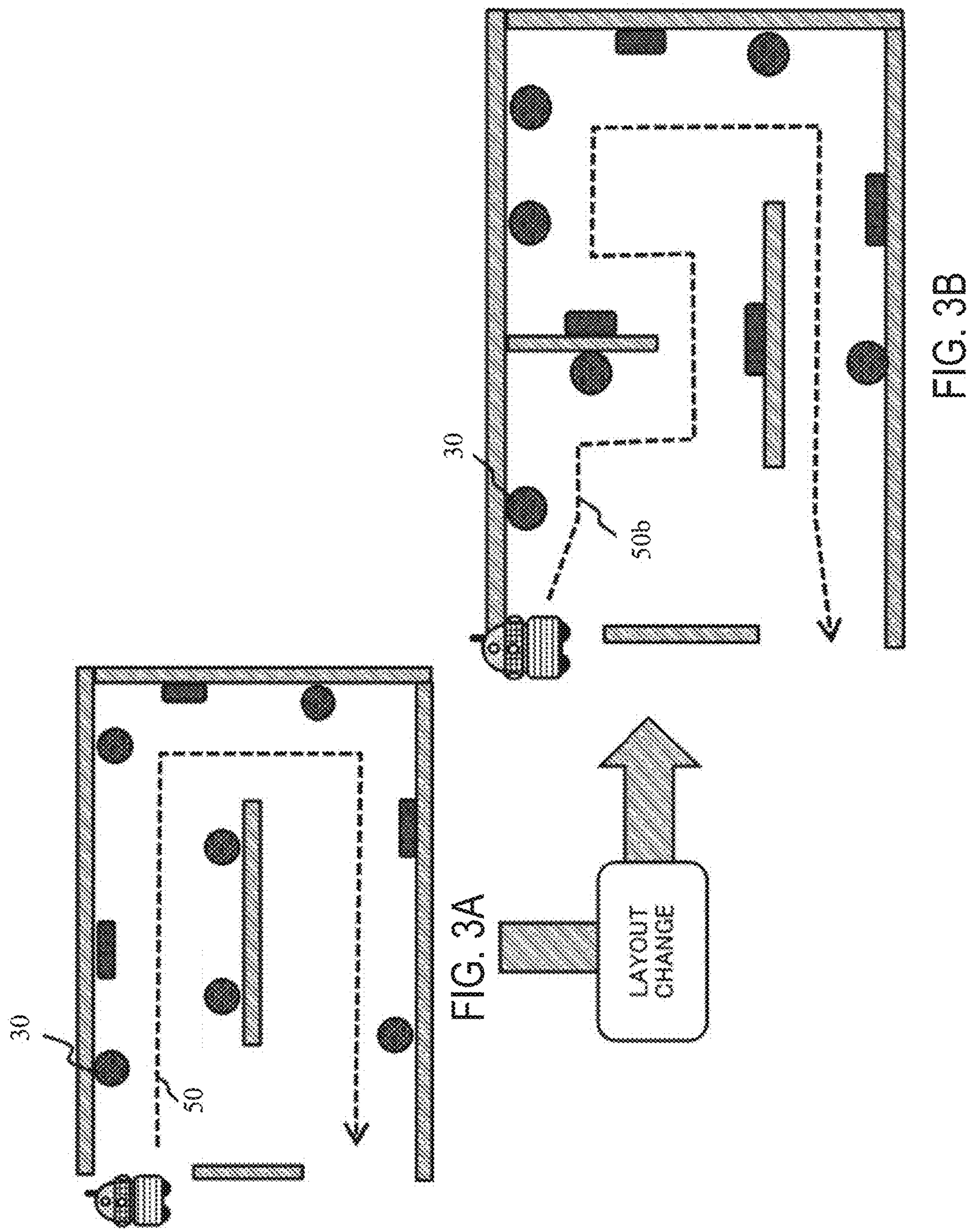
FIGS. 3A and 3B are explanatory drawings showing an example of layout change processing in a region where the guide robot provides guidance processing.

FIGS. 3A and 3B show an example of a layout change.

FIG. 3A is a layout described with reference to FIGS. 1 and 2A-2D. The guide route 50 is set in the layout.

For example, the layout may be changed to another layout illustrated in FIG. 3B.

With such a layout change, the guide route 50 is unusable and a new guide route b, 50*b* needs to be generated.

Furthermore, robot stop positions and explanation positions or the like need to be set also on the new route B, 50*b*.

In addition, art galleries or the like may have, for example, spaces where special exhibits are displayed and extra charges are required for admission, or off-limits areas set for changing exhibits.

Figure 4B:
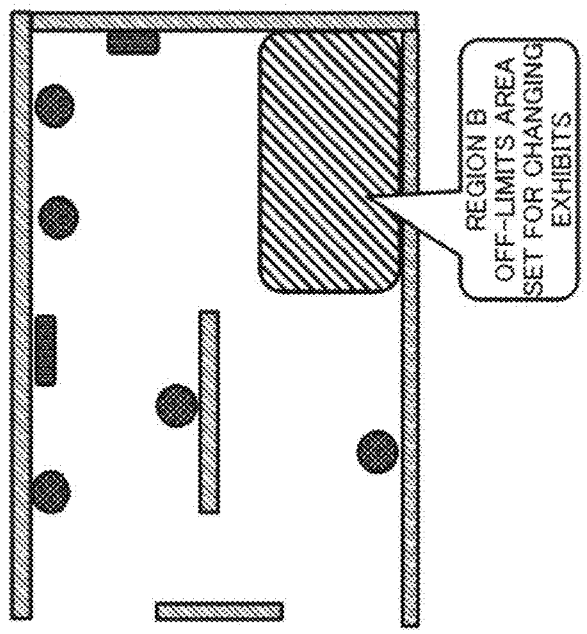
FIGS. 4A and 4B are explanatory drawings showing an example of layout change processing in a region where the guide robot provides guidance processing.
Figure 4A:
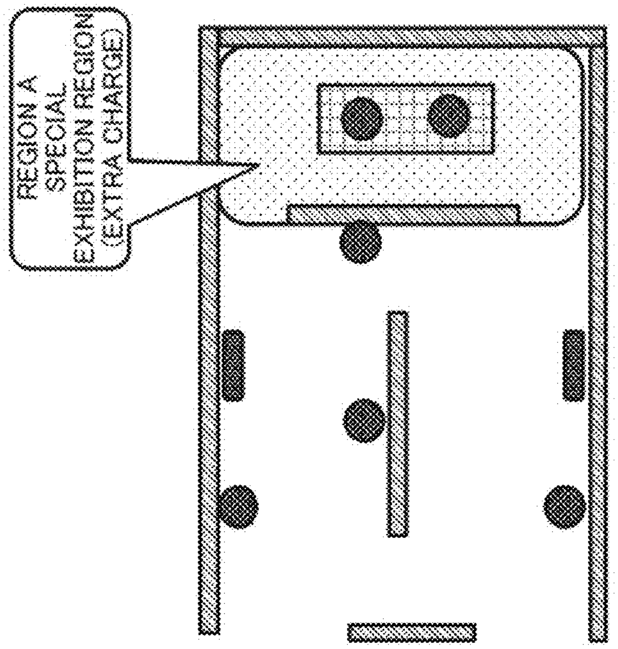

A specific example is illustrated in FIGS. 4A and 4B.

FIG. 4A is an example of the layout of a set area A where special exhibits are displayed and an extra charge is required for admission.

FIG. 4B is an example of the layout of a set area B that is an off-limits area set for changing exhibits.

Also in such a case, a new guide route needs to be generated according to each layout, and robot stop positions and explanation positions or the like need to be additionally set on the new route.

Generating such a new route under confirmation by an operator may increase time and cost and is likely to cause a route generation error or the like.

The following is the configuration and processing of the information processing device that can solve such a problem and efficiently generate a route with high accuracy according to the present disclosure.

[2. Overview of Configuration and Processing of Information Processing Device According to Present Disclosure]

The overview of the configuration and processing of the information processing device according to present disclosure will be described below.

Figure 5:
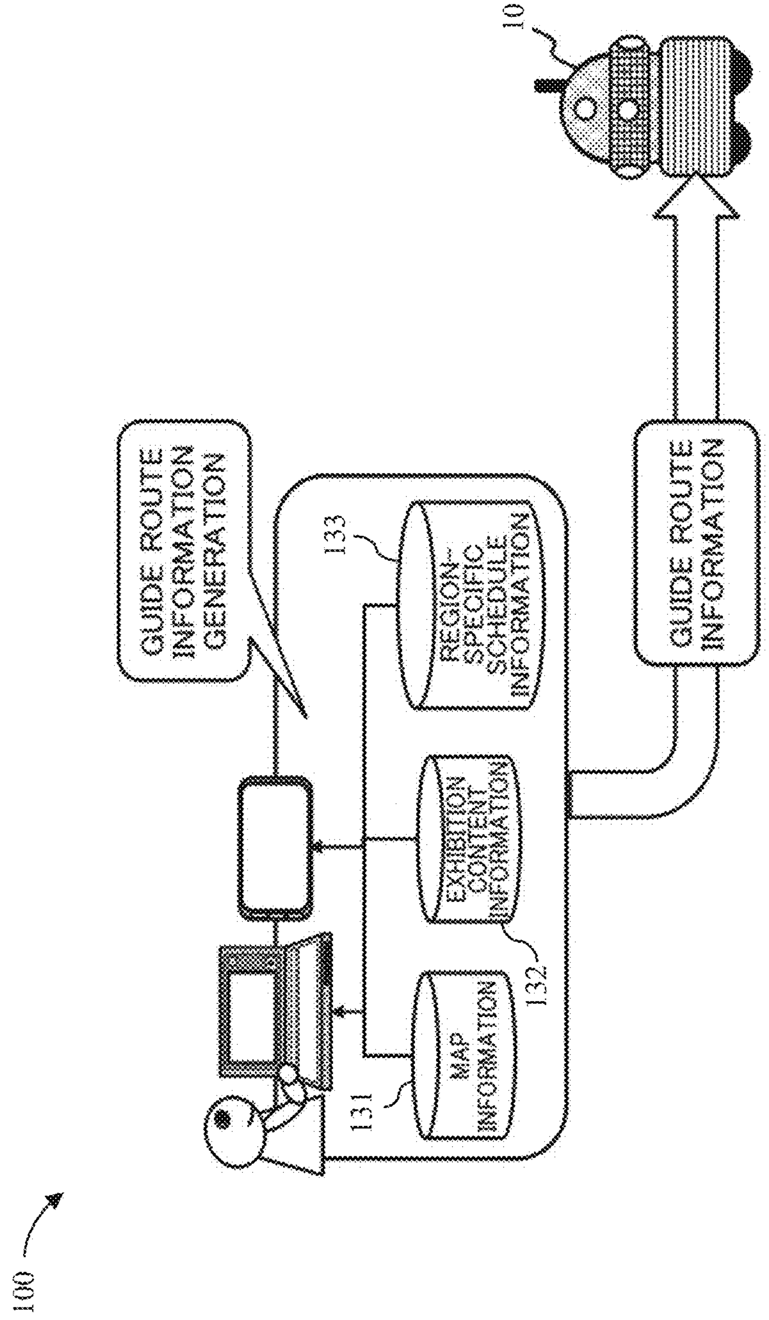
FIG. 5 is an explanatory drawing illustrating the relationship between an information processing device according to the present disclosure and the robot.

FIG. 5 is an explanatory drawing illustrating the relationship between an information processing device 100 and the robot 10 according to the present disclosure.

The information processing device 100 of the present disclosure is configured with, for example, a PC or a tablet terminal such as a smartphone. The information processing device 100 generates guide route information including guide route information for traveling of the robot 10 and stores the information in the storage unit of the robot 10.

The guide route information may include stop positions on the route and greetings and explanations or the like to be provided by the robot 10 as well as the guide route information for traveling of the robot 10.

The information processing device 100 receives the input of operation information by the operator and generates guide route information by using map information 131, exhibition content information 132, and region-specific schedule information 133.

Referring to FIG. 6 and subsequent drawings, the map information 131, the exhibition content information 132, the region-specific schedule information 133, and specific examples thereof will be described below.

Referring to FIG. 6, a specific example of the map information 131 will be first described below.

The map information 131 is map information about a region where the robot 10 provides guidance. For example, when the robot 10 provides guidance in an art gallery, the map information indicates the gallery map.

The left table in FIG. 6 is a table indicating data constituting the map information 131. The data constituting the map information 131 includes:

(a) Region information (b) Guide spot information

The region information includes region identifiers and region position information corresponding to the region identifiers.

The guide spot information includes guide spot identifiers, exhibits (exhibits A, B, C, . . . ) corresponding to the guide identifiers, and guidance spot position information corresponding to the guide identifiers.

These pieces of data specifically correspond to registration information in the map data shown on the right side of FIG. 6. The map data shown on the right side of FIG. 6 is the map of a region where the robot 10 provides guidance, specifically, the map of an art gallery where the robot 10 provides guidance.

The map data shown on the right side of FIG. 6 indicates regions such as a region A and a region B that are listed in the table as data constituting the map information 131 on the left side of FIG. 6.

In the map information 131, the region identifiers of the regions and position information about the regions are recorded. Recorded as position information of a region is, for example, the vertex coordinate data of rectangles that determine the respective regions on the xy coordinate plane representing the overall region where the robot 10 provides guidance.

The map data shown on the right side of FIG. 6 indicates guide spots such as guide spots a1, a2, b1, and b2 that are listed in the table as data constituting the map information 131 on the left side of FIG. 6.

The guide spot is, for example, a position where the robot 10 stops to explain an exhibit.

Recorded in the map information 131 includes the identifiers of the guide spots and position information about the guide spots, for example, coordinate data of the guide spots.

In this way, registered in the map information 131 includes the position of each divided region of the overall region where the robot 10 provides guidance, and the position of the spot where the robot 10 stops to explain an exhibit.

As described above, the explanation by the robot 10 is provided by either audio data output processing via a speaker attached to the robot 10, or display data output processing of explanations, still images, or videos via a display (display unit) attached to the robot 10, or a combination thereof.

Referring to FIGS. 7A and 7B, the exhibition content information 132, the region-specific schedule information 133, and specific examples thereof will be described below.

As shown in FIGS. 7A and 7B, the following items of data are recorded in correlation with one another in the exhibition content information 132.

(a) Region identifier (b) Region exhibition contents (c) Guide spot identifier (d) Guide spot exhibit (e) Guidance time (exhibition content guidance time)

(a) A region identifier indicates data included in the map information 131 described with reference to FIG. 6, and an identifier for each divided region of the overall region where the robot 10 provides guidance.

(b) A region exhibition content indicates overview information about exhibits in each region.

(c) A guide spot identifier indicates the identifier of a guide spot included in each region.

(d) A guide spot exhibit indicates overview information about an exhibit at each guide spot. For example, exhibit names (exhibits A, B, C, . . . ) are recorded.

(e) Guidance time (exhibition content guidance time) indicates the time required for the robot to explain exhibition contents at a guide spot.

As shown in FIGS. 7A and 7B, the following items of data are recorded in correlation with one another in the region-specific schedule information 133.

(a) Region identifier (b) Availability schedule (c) Charge (a) A region identifier indicates data included in the map information 131 described with reference to FIG. 6, and an identifier for each divided region of the overall region where the robot 10 provides guidance.

(b) An availability schedule indicates date/time information about the availability of each region.

(c) A charge indicates charge information about payment by a visitor when the visitor views an exhibit in each region.

The information processing device 100 of the present disclosure generates the guide route of the robot 10, that is, a guide route by using the map information 131, the exhibition content information 132, and the region-specific schedule information 133.

The guide route generated for the robot 10 by the information processing device 100 of the present disclosure includes a plurality of nodes and a path connecting the nodes.

Figure 8:
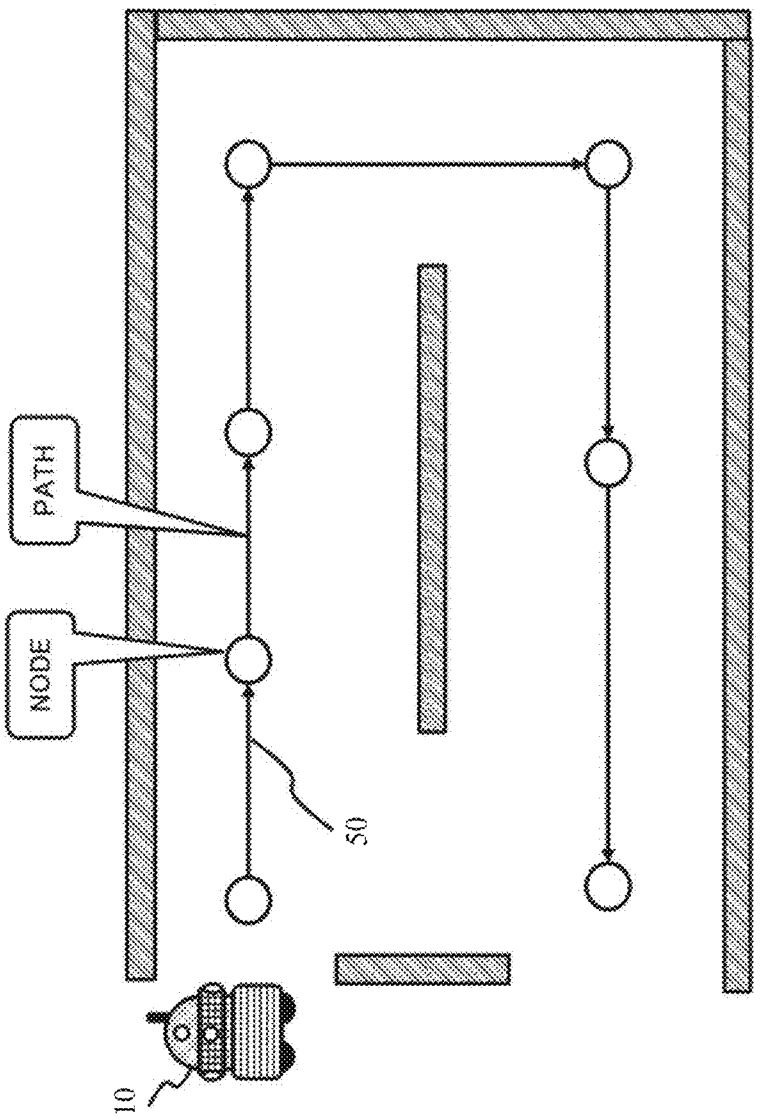
FIG. 8 is an explanatory drawing showing a specific example of a guide route generated for the robot by the information processing device.

Referring to FIG. 8, a specific example of the guide route generated for the robot 10 by the information processing device 100 will be described below.

FIG. 8 shows an example of the guide route 50 generated for the robot 10 by the information processing device 100. As illustrated in FIG. 8, the guide route 50 generated for the robot 10 by the information processing device 100 includes a plurality of nodes and paths connecting the nodes.

The node is a point that can be set at any position by an operator who operates the information processing device 100. The node is, for example, the position of the guide spot described with reference to FIG. 6 or a point where the robot 10 changes the traveling direction. The path includes the connection line (connection path) of two nodes.

[3. Detailed Configuration of Information Processing Device According to the Present Disclosure]

A detailed configuration of the information processing device according to the present disclosure will be described below.

Figure 9:
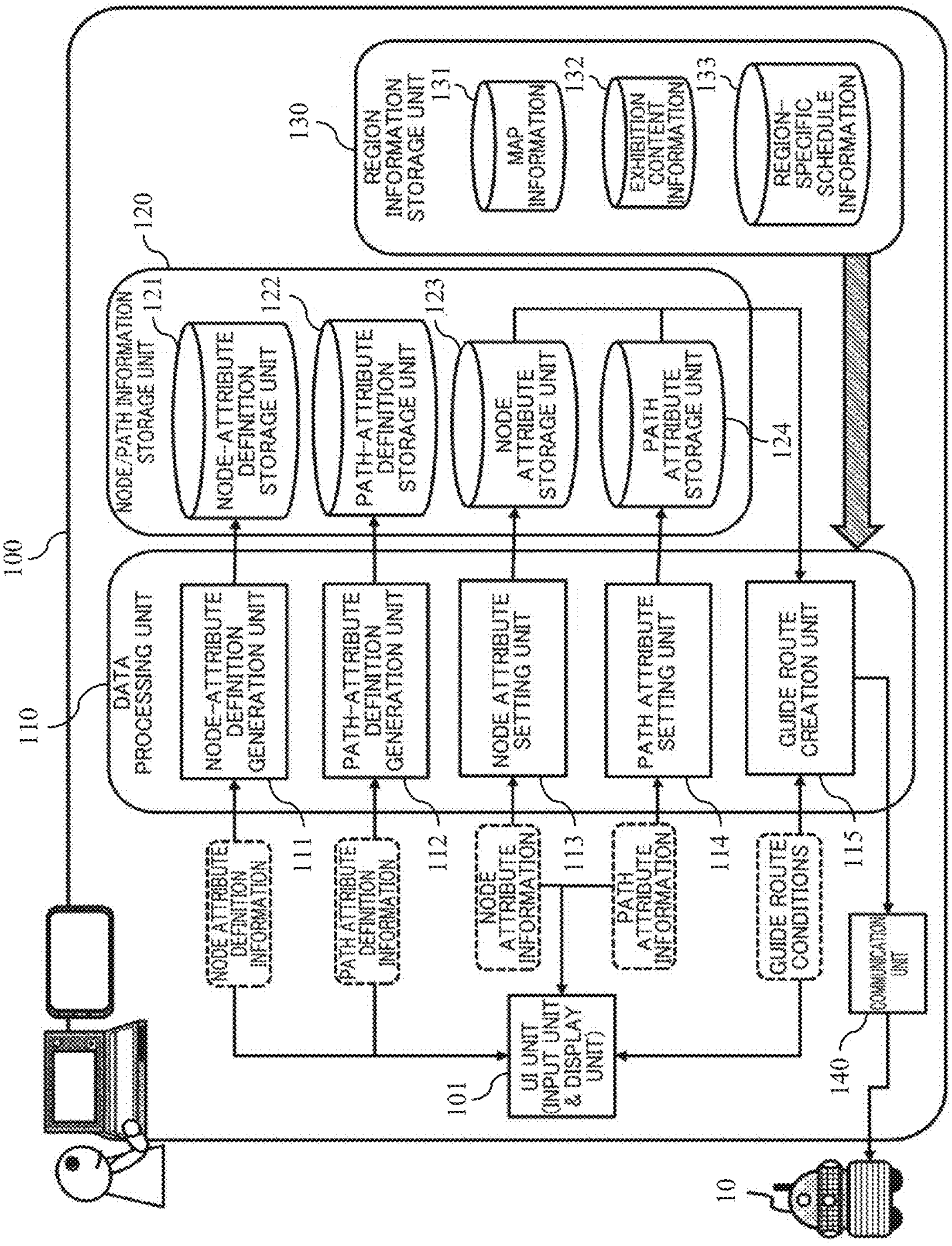
FIG. 9 is an explanatory drawing illustrating a configuration example of the information processing device according to the present disclosure.

FIG. 9 illustrates a configuration example of the information processing device 100 according to the present disclosure.

As described above with reference to FIG. 5, the information processing device 100 of the present disclosure is configured with, for example, a PC or a tablet terminal such as a smartphone. The information processing device 100 generates guide route information including guide route information for traveling of the robot 10 and stores the information in the storage unit of the robot 10.

As illustrated in FIG. 9, the information processing device 100 of the present disclosure includes a UI unit (input unit & display unit) 101, a data processing unit 110, a node/path information storage unit 120, a region information storage unit 130, and a communication unit 140.

The data processing unit 110 includes a node-attribute definition generation unit 111, a path-attribute definition generation unit 112, a node attribute setting unit 113, a path attribute setting unit 114, and a guide route creation unit 115.

The node/path information storage unit 120 includes a node-attribute definition storage unit 121, a path-attribute definition storage unit 122, a node attribute storage unit 123, and a path attribute storage unit 124.

Furthermore, the map information 131, the exhibition content information 132, and the region-specific schedule information 133 are stored in the region information storage unit 130.

The UI unit (input unit & display unit) 101 includes an input unit and a display unit, for example, a touch panel. The UI unit (input unit & display unit) 101 further includes a keyboard and a mouse or the like that allows a user (operator) of the information processing device 100 to input various kinds of data.

The data processing unit 110 performs various kinds of data processing using data input through the UI unit (input unit & display unit) 101. Specifically, for example, the following processing is performed:

(a) processing for generating a node attribute definition for each node on the basis of user input data (node attribute definition information) and storing the definition in the node-attribute definition storage unit 121 by the node-attribute definition generation unit 111.

(b) processing for generating a path attribute definition for each path on the basis of user input data (path attribute definition information) and storing the definition in the path-attribute definition storage unit 122 by the path-attribute definition generation unit 112.

(c) processing for setting a node attribute for each node on the basis of user input data (node attribute information) and storing the attribute in the node attribute storage unit 123 by the node attribute setting unit 113.

(d) processing for setting a path attribute for each path on the basis of user input data (path attribute information) and storing the attribute in the path attribute storage unit 124 by the path attribute setting unit 114.

The processing (a) to (d) is performed as preparatory processing before the guide route of the robot 10 is generated.

The specific processing examples and the detail of the processing will be described later.

Furthermore, the guide route creation unit 115 of the data processing unit 110 creates the optimal guide route of the robot 10 on the basis of data (guide route conditions) input through the UI unit (input unit & display unit) 101.

The guide route creation unit 115 creates the optimal guide route of the robot 10 with reference to attribute information about nodes in the node attribute storage unit 123 and attribute information about paths in the path attribute storage unit 124.

A specific example of this processing will be described later.

The processing in the data processing unit 110 is performed with reference to the map information 131, the exhibition content information 132, and the region-specific schedule information 133 in the region information storage unit 130.

The map information 131, the exhibition content information 132, and the region-specific schedule information 133 in the region information storage unit 130 correspond to the information described with reference to FIGS. 6, 7A, and 7B.

The guide route information generated by the guide route creation unit 115 of the data processing unit 110 is transmitted to the robot 10 via the communication unit 140. The robot 10 stores, in the storage unit, the guide route information received from the information processing device 100 and performs processing including traveling, stop, and guidance.

In the example of FIG. 9, the region information storage unit 130, in which the map information 131, the exhibition content information 132, and the region-specific schedule information 133 are stored, is configured in the information processing device 100. The information may be stored in an external device, for example, a cloud server and may be retrieved from the server (cloud) by the information processing device 100 as necessary.

Figure 10:
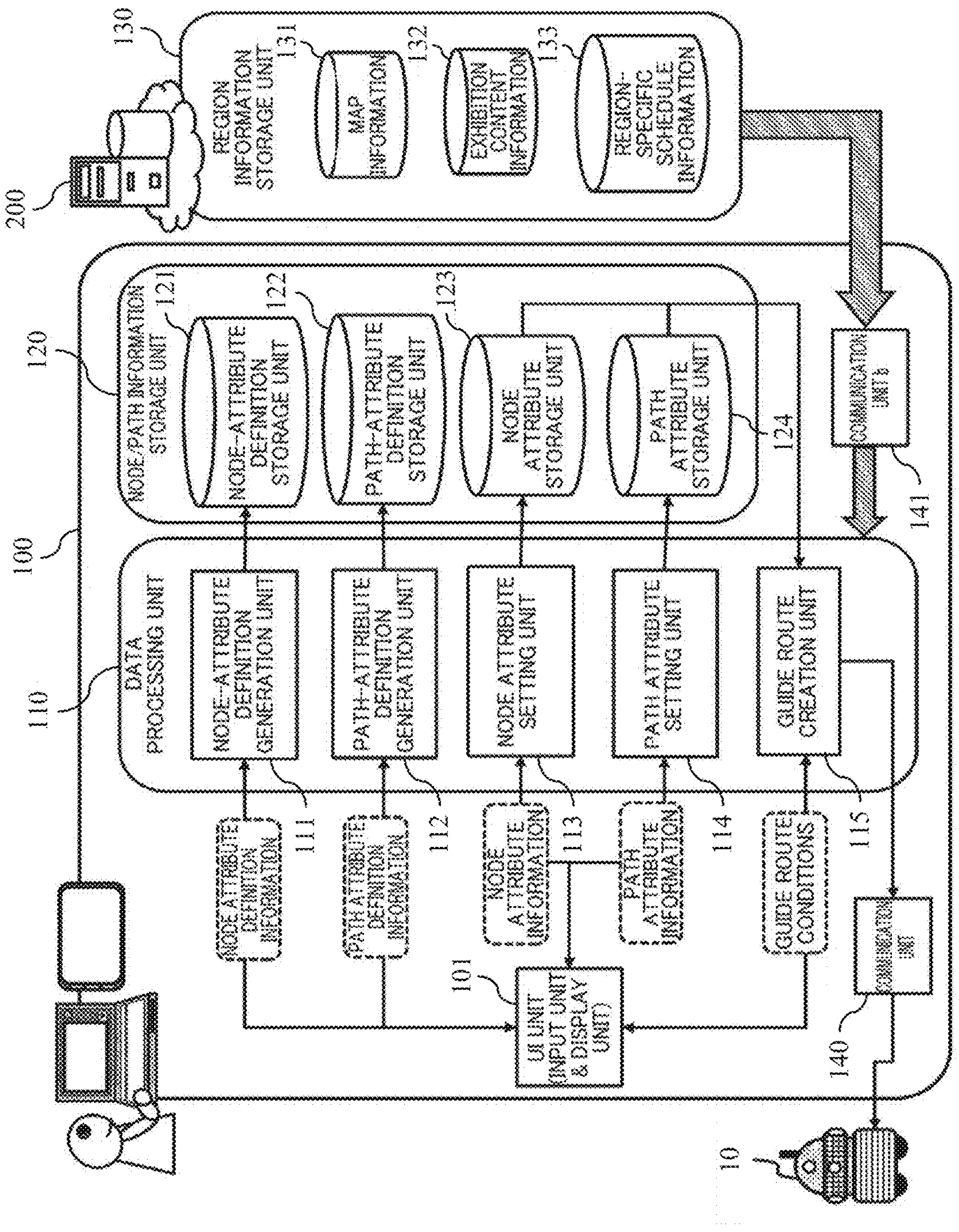
FIG. 10 is an explanatory drawing illustrating a configuration example of the information processing device according to the present disclosure.

In other words, as illustrated in FIG. 10, an external device 200 such as a server (cloud) includes the region information storage unit 130 in which the map information 131, the exhibition content information 132, and the region-specific schedule information 133 are stored.

The data processing unit 110 of the information processing device 100 may be configured to access the external device 200 such as a server (cloud) via a communication unit b141 and retrieve the map information 131, the exhibition content information 132, and the region-specific schedule information 133 as necessary.

Furthermore, FIG. 10 illustrates a configuration example in which the single information processing device 100 includes the data processing unit 110 and the node/path information storage unit 120. These units may be configured as separate units. For example, the node/path information storage unit 120 may be included in a device other than the information processing device 100 in FIG. 10, for example, the external device 200 such as a server (cloud).

An example of stored data of four data storage units in the node/path information storage unit 120 of the information processing device 100 in FIGS. 9 and 10 will be described below. The four data storage units are the node-attribute definition storage unit 121, the path-attribute definition storage unit 122, the node attribute storage unit 123, and the path attribute storage unit 124.

Referring to FIG. 11, an example of stored data of the node-attribute definition storage unit 121 will be described below.

The recording processing of the node attribute definition information in the node-attribute definition storage unit 121 is performed by the node-attribute definition generation unit 111 of the above-mentioned data processing unit 110.

In other words, the node-attribute definition generation unit 111 generates a node attribute definition for each node on the basis of user input data (node attribute definition information) and stores generated node attribute definition information in the node-attribute definition storage unit 121.

As shown in FIG. 11, the following items of data are recorded in correlation with one another in the node-attribute definition storage unit 121.

(a) Node attribute ID
(b) Node attribute name
(c) Node attribute type (numeric value, truth value, evaluation, user definition, period)
(d) Unit (when the attribute type is a numeric value)
(e) Level (when the attribute type is an evaluation)
(f) User definition type (when the attribute type is a user definition)

(a) A node attribute ID is the recording region of the identifier (ID) of a node attribute (b) A node attribute name is the recording region of the node attribute of a node attribute. For example, the following node attribute names are registered in correlation with respective node attribute IDs.

Node attribute 01="charge for node guidance"
Node attribute 02="mean stay time at node"
Node attribute 03="value of exhibit at node"
Node attribute 04="satisfaction level during stay at node"
Node attribute 05="person (inside or outside) to be guided to node"
Node attribute 06="person to be guided to node (sex)"
Node attribute 07="node unavailability period"
Node attribute 08="node availability period limited to staff member"

(c) The node attribute type (numeric value, truth value, evaluation, user definition, period) is the recording region of a node attribute type. Any one of a numeric value, a truth value, an evaluation, a user definition, and a period is recorded as the node attribute type.

(d) The unit (when the attribute type is a numeric value) indicates that the unit is recorded when the node attribute type is "numeric value." For example, units such as yen, dollar, minute, and second are recorded.

(e) The level (when the attribute type is an evaluation) indicates that the level is recorded when the node attribute type is "evaluation." For example, the total number of levels, e.g., ten levels or five levels is recorded.

(f) The user definition type (when the attribute type is a user definition) indicates that user definition data is recorded when the node attribute type is "user definition." For example, various kinds of user definition data, for example, a staff member, a guest, Any, a man, and a woman are recorded.

FIG. 11 shows an example in which corresponding data including "attribute name," "attribute type," "unit, level, or user definition" as below is stored as stored data of the node-attribute definition storage unit 121.

Node attribute 01="charge for node guidance," "numeric value," "yen"
Node attribute 02="mean stay time at node," "numeric value," "minute"
Node attribute 03="value of exhibit at node," "evaluation," "ten levels"
Node attribute 04="satisfaction level during stay at node," "evaluation," "five levels"
Node attribute 05="person (inside or outside) to be guided to node," "user definition," "Any, staff member, guest"
Node attribute 06="person to be guided to node (sex)," "user definition," "Any, man, woman, non-response"
Node attribute 07="node unavailability period," "period," "-"
Node attribute 08="node availability period limited to staff member," "period," "-"

Moreover, node attribute definition information recorded in the node-attribute definition storage unit 121 is generated by input processing of a user (operator). In other words, the node-attribute definition generation unit 111 generates a node attribute definition for each node on the basis of user input data (node attribute definition information) and stores generated node attribute definition information in the node-attribute definition storage unit 121.

A specific example of user input processing will be described later.

For example, "node attribute definitions" shown in FIG. 11 may be all set by a person in charge of accepting the robot at the facility where the robot is introduced, or frequently used attributes may be configured to be provided in advance as presets.

Specifically, for example, "art-gallery attribute set" or "shopping-mall attribute set" may be provided.

For example, when creating a guide route for souvenir shops in a tourist spot, the following node attribute can be set as node attributes corresponding to nodes in front of various items for sale.

Node attribute=the sales of an item in front of a node for one month (type: numeric value, unit: yen)

In addition, the following node attributes can be set as node attributes for nodes to be used in creating guide routes for sightseeing in Japanese gardens and towns.

Node attribute=the historical value of a sightseeing spot at a node position (type: evaluation, level: 10)

Node attribute=scenery at a node position (type: evaluation, level: 10)

Node attribute=the level of appeal by a town for a spot at a node position (type: evaluation, level: 10)

In addition, the following node attributes can be set as node attributes for nodes to be used in creating guide routes for event venue tours.

Node attribute=the rating of a spot corresponding to a node (type: evaluation, level: 10)

Node attribute=the presence or absence of reception of a commemorative item at a spot corresponding to a node (type: truth value)

In this way, various node attributes can be set according to the characteristics of a route where the robot provides guidance.

Referring to FIG. 12, an example of stored data of the path-attribute definition storage unit 122 will be described below.

The recording processing of the path attribute definition information in the path-attribute definition storage unit 122 is performed by the path-attribute definition generation unit 112 of the above-mentioned data processing unit 110.

In other words, the path-attribute definition generation unit 112 generates a path attribute definition for each path on the basis of user input data (path attribute definition information) and stores the generated path attribute definition information in the path-attribute definition storage unit 122.

As shown in FIG. 12, the following items of data are recorded in correlation with one another in the path-attribute definition storage unit 122.

(a) Path attribute ID
(b) Path attribute name
(c) Path attribute type (numeric value, truth value, evaluation, user definition)
(d) Unit (when the attribute type is a numeric value)
(e) Level (when the attribute type is an evaluation)
(f) User definition type (when the attribute type is a user definition)

(a) A path attribute ID is the recording region of the identifier (ID) of a path attribute (b) A path attribute name is the recording region of the name of a node attribute For example, the following node attribute names are registered in correlation with respective path attribute IDs.

Path attribute 01="Distance of path"

Path attribute 02="Moving time of path"

Path attribute 03="if baby buggy and wheelchair are usable or not on path"

(c) The path attribute type (numeric value, truth value, evaluation, user definition) is the recording region of a path attribute type. Any one of a numeric value, a truth value, an evaluation, and a user definition is recorded as the path attribute type.

(d) The unit (when the attribute type is a numeric value) indicates that the unit is recorded when the path attribute type is "numeric value." For example, units such as yen, dollar, minute, and second are recorded.

(e) The level (when the attribute type is an evaluation) indicates that the level is recorded when the path attribute type is "evaluation." For example, the total number of levels, e.g., ten levels or five levels is recorded.

(f) The user definition type (when the attribute type is a user definition) indicates that user definition data is recorded when the path attribute type is "user definition." For example, various kinds of user definition data, for example, a staff member, a guest, Any, a man, and a woman are recorded.

FIG. 12 shows an example in which corresponding data including "attribute name," "attribute type," "unit, level, or user definition" as below is stored as stored data of the path-attribute definition storage unit 122.

Path attribute 01="Distance of path," "numeric value," "m"

Path attribute 02="Moving time of path," "numeric value," "second"

Path attribute 03="if baby buggy and wheelchair are usable or not on path," "truth value," "-"

Moreover, path attribute definition information recorded in the path-attribute definition storage unit 122 is generated by input processing of a user (operator). In other words, the path-attribute definition generation unit 112 generates a path attribute definition for each path on the basis of user input data (path attribute definition information) and stores generated path attribute definition information in the path-attribute definition storage unit 122.

After the completion of storage of the node attribute definition information in the node-attribute definition storage unit 121 in FIG. 11 and storage of the path attribute definition information in the path-attribute definition storage unit 122 in FIG. 12, the user (operator) performs the setting of a node attribute for each node and the setting of a path attribute for each path.

In other words, the node attribute setting unit 113 sets a node attribute for each node on the basis of data (node attribute information) input by the user (operator) through the UI unit (input unit & display unit) 101 and stores the setting information in the node attribute storage unit 123.

Furthermore, the path attribute setting unit 114 sets a path attribute for each path on the basis of data (path attribute information) input by the user (operator) through the UI unit (input unit & display unit) 101 and stores the setting information in the path attribute storage unit 124.

FIG. 13 shows an example of node attributes stored in the node attribute storage unit 123 by the foregoing processing.

FIG. 14 shows an example of path attributes stored in the path attribute storage unit 124 by the foregoing processing.

Referring to FIG. 13, an example of node attributes stored in the node attribute storage unit 123 will be described below. In the node attribute storage unit 123, various kinds of node attribute information are recorded in correlation with the node identifiers (node IDs) and node names of nodes.

As node names, for example, the names of exhibits (exhibits A, B, . . . ) are recorded. The exhibit names (exhibits A, B, . . . ) are identical to those of the map information 131 described with reference to FIG. 6 and information (exhibits A, B, . . . ) registered in the exhibition content information 132. Node position information or the like can be retrieved from the map information 131 according to the node names, and guidance time information or the like at each node can be retrieved from the exhibition content information 132.

The node attribute information is recorded in correlation with nodes (node identifiers, node names) as follows:

(a) Node attribute 01 (charge (yen))

(b) Node attribute 02 (stay time (minute))

(c) Node attribute 03 (value of exhibit)

(d) Node attribute 04 (satisfaction level)

(e) Node attribute 05 (person (inside or outside) to be guided)

(f) Node attribute 06 (person to be guided (sex))

(g) Node attribute 07 (unavailable period)

(h) Node attribute 08 (available period limited to staff member)

The node attributes 01 to 08 correspond to node attributes 01 to 08 stored in the node-attribute definition storage unit 121 described with reference to FIG. 11. In other words, Node attribute 01="charge for node guidance," "numeric value," "yen"

Node attribute 02="mean stay time at node," "numeric value," "minute"

Node attribute 03="value of exhibit at node," "evaluation," "ten levels"

Node attribute 04="satisfaction level during stay at node," "evaluation," "five levels"

Node attribute 05="person (inside or outside) to be guided to node," "user definition," "Any, staff member, guest"

Node attribute 06="person to be guided to node (sex)," "user definition," "Any, man, woman, non-response"

Node attribute 07="node unavailability period," "period," "-" Node attribute 08="node availability period limited to staff member," "period,"

In the node attribute storage unit 123 shown in FIG. 13, the node attributes of nodes are recorded. Data is input by the user (operator).

(a) Node attribute 01 (charge (yen)) in the node attribute storage unit 123 shown in FIG. 13 indicates the recording region of "charge for node guidance" of the corresponding node. For example, node A in the recording data shown in FIG. 13 indicates a node set as a viewing point of exhibit A, which is a node name, and the charge for guidance of node A corresponding to exhibit A is 300 yen.

(b) Node attribute 02 (stay time (minute)) is the recording region of "mean stay time at node." For example, node A in the recording data shown in FIG. 13 indicates a node set as a viewing point of exhibit A, which is a node name, and the mean stay time at node A corresponding to exhibit A is 5 minutes.

(c) Node attribute 03 (value of exhibit) is the recording region of "value of exhibit at node." For example, the recording data of node A in FIG. 13 indicates that the value of exhibit A is rated as level 10 on a 1-to-10 scale.

(d) Node attribute 04 (satisfaction level) is the recording region of "satisfaction level during stay at node." For example, the recording data of node A in FIG. 13 indicates that the satisfaction level during stay at node A serving as the viewing node of exhibit A is rated as level 4 on a 1-to-5 scale.

(e) Node attribute 05 (person (inside or outside) to be guided) is the recording region of "person (inside or outside) to be guided to node." For example, the recording data of node A in FIG. 13 indicates that the person (inside or outside) to be guided to node A serving as the viewing node of exhibit A is a guest.

(f) Node attribute 06 (person to be guided (sex)) is the recording region of "person to be guided to node (sex)." For example, the recording data of node A in FIG. 13 indicates that the person to be guided (sex) to node A serving as the viewing node of exhibit A is Any (may be a man or a woman).

(g) Node attribute 07 (unavailable period) is the recording region of "node unavailability period." For example, the recording data of node A in FIG. 13 indicates that the unavailable period of node A serving as the viewing node of exhibit A is not set.

(h) Node attribute 08 (available period limited to staff member) is the recording region of "node availability period limited to staff member." For example, the recording data of node A in FIG. 13 indicates that the available period limited to staff members is not set at node A serving as the viewing node of exhibit A.

These pieces of node attribute setting data are input by the user (operator) through the UI unit (input unit & display unit) 101 of the information processing device 100. A specific example of data input will be described later.

Referring to FIG. 14, an example of path attributes stored in the path attribute storage unit 124 will be described below. In the path attribute storage unit 124, various kinds of path attribute information are recorded in correlation with the path identifiers (path IDs) and path names of paths.

The path name is set so as to identify two connected nodes. Specifically, the last two characters (such as AB, BC, CD) of the path name indicate the node IDs (such as node A and node B) of two nodes connected via a path.

A path AB (Path AB) is a path connecting node A and node B, and a path BC (Path BC) is a path connecting node B and node C.

In the path attribute storage unit 124, the path attribute information is recorded in correlation with each path (path identifier, path name) as below.

(a) Path attribute 01 (distance (m))

(b) Path attribute 02 (moving time (second))

(c) Path attribute 03 (baby buggy, wheelchair)

The path attributes 01 to 03 correspond to path attributes 01 to 03 stored in the path-attribute definition storage unit 122 described with reference to FIG. 12. Specifically, Path attribute 01="Distance of path," "numeric value," "m"

Path attribute 02="Moving time of path," "numeric value," "second"

Path attribute 03="if baby buggy and wheelchair are usable or not on path," "truth value," "."

In the path attribute storage unit 124 shown in FIG. 14, the path attributes of paths are recorded. Data is input by the user (operator).

(a) Path attribute 01 (distance (m)) of the path attribute storage unit 124 in FIG. 14 is the recording region of "distance of path" of the corresponding path. For example, in the recording data of FIG. 14, path AB indicates recording data on a path (route) connecting node A and node B, and the distance of path AB is 2.5 m.

(b) Path attribute 02 (moving time (second)) is the recording region of "moving time of path." For example, the recording data of FIG. 14 indicates that the moving time of path AB is three seconds.

(c) Path attribute 03 (if baby buggy and wheelchair are usable or not on path) is the recording region of "if baby buggy and wheelchair are usable or not on path." For example, the recording data of FIG. 14 indicates that the path attribute 03 of path AB is Yes and a baby buggy and a wheelchair are usable on path AB.

These pieces of path attribute setting data are input by the user (operator) through the UI unit (input unit & display unit) 101 of the information processing device 100. A specific example of data input will be described later.

[4. Specific Example of Generation and Storage Processing of Node Attribute Definition Information]

A specific example of generation and storage processing of the node attribute definition information will be described below.

As described above, in the node-attribute definition storage unit 121 in the node/path information storage unit 120 of the information processing device 100 illustrated in FIGS. 9 and 10, the recording processing of the node attribute definition information is performed by the node-attribute definition generation unit 111 of the data processing unit 110.

In other words, the node-attribute definition generation unit 111 generates a node attribute definition for each node on the basis of user input data (node attribute definition information) and stores generated node attribute definition information in the node-attribute definition storage unit 121.

The user (operator) registers the node attribute definition to be stored in the node-attribute definition storage unit 121, through the UI unit (input unit & display unit) 101 of the information processing device 100.

The UI unit (input unit & display unit) 101 is available as, for example, a UI unit (input unit & display unit) in the form of a touch panel serving as the display unit of the information processing device 100. A UI (user interface) enabling data entry is displayed on the display unit, and the user (operator) performs various operations on the displayed UI, so that node attribute definition information can be registered.

Hereinafter, referring to FIG. 15 and subsequent drawings, a specific example of generation and storage processing of the node attribute definition information to be stored in the node-attribute definition storage unit 121 will be described along with a specific example of the UI displayed on the display unit used as the UI unit (input unit & display unit) 101 of the information processing device 100.

Figure 15:
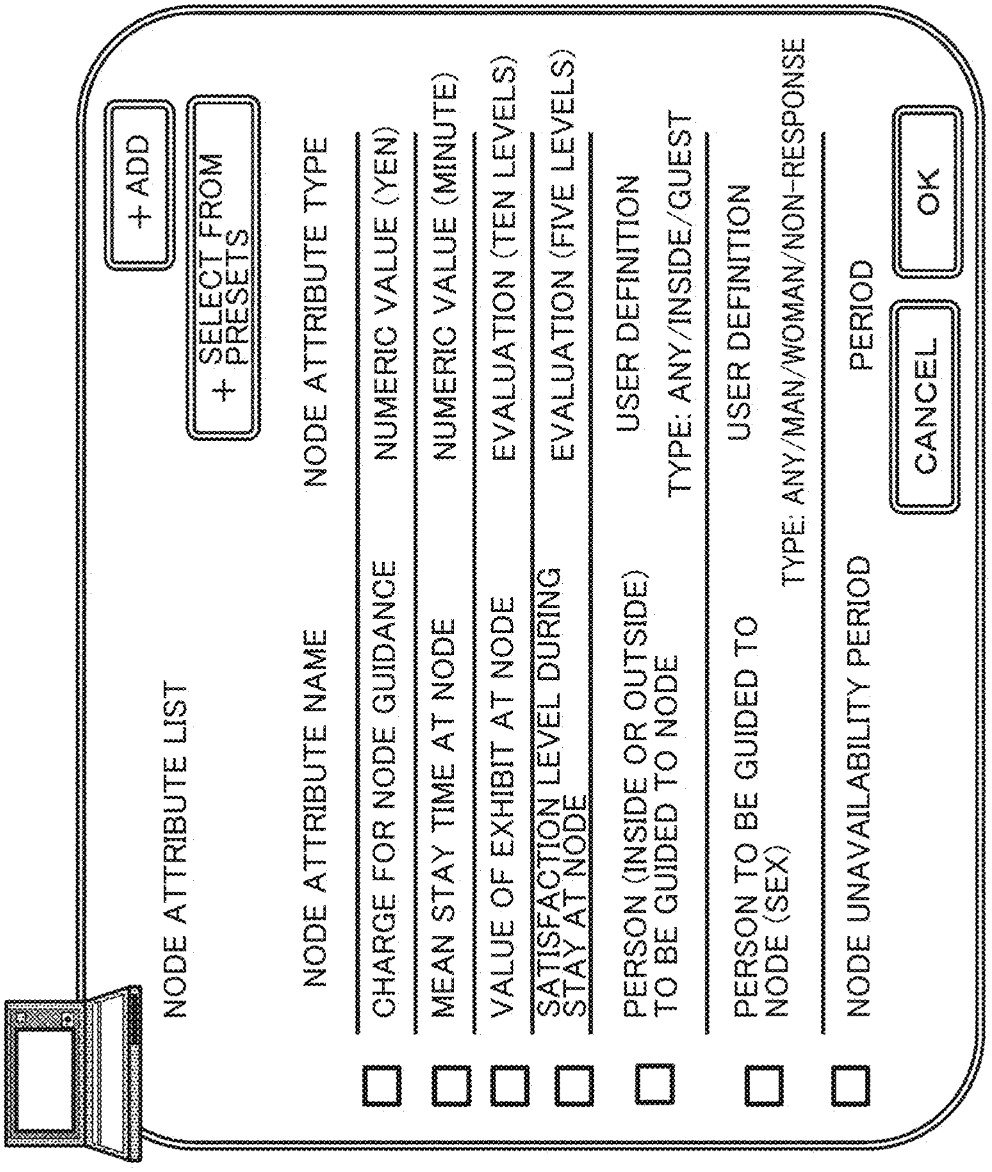
FIG. 15 is an explanatory drawing showing a specific example of generation and storage processing of node attribute definition information stored in the node-attribute definition storage unit.

FIG. 15 shows an example of the UI displayed on the display unit of the information processing device during recording processing of the node attribute definition information in the node-attribute definition storage unit 121 in the node/path information storage unit 120 of the information processing device 100. The UI is, for example, a UI generated by a node-attribute definition generation application executed by the node-attribute definition generation unit 111 of the data processing unit 110 of the information processing device 100.

The UI in FIG. 15 displays list information about preset node attributes that are set in advance as preset data.

In the example of FIG. 15, corresponding data including "attribute name," "attribute type," "unit, level, or user definition" as below is displayed as list information about the preset node attributes.

"Charge for node guidance," "numeric value," "yen"

"Mean stay time at node," "numeric value," "minute"

"Value of exhibit at node," "evaluation," "ten levels"

"Satisfaction level during stay at node," "evaluation," "five levels"

"Person (inside or outside) to be guided to node," "user definition," "Any, staff member, guest"

"Person to be guided to node (sex)," "user definition," "Any, man, woman, non-response"

"Node unavailability period," "period," "_"

Figure 16:
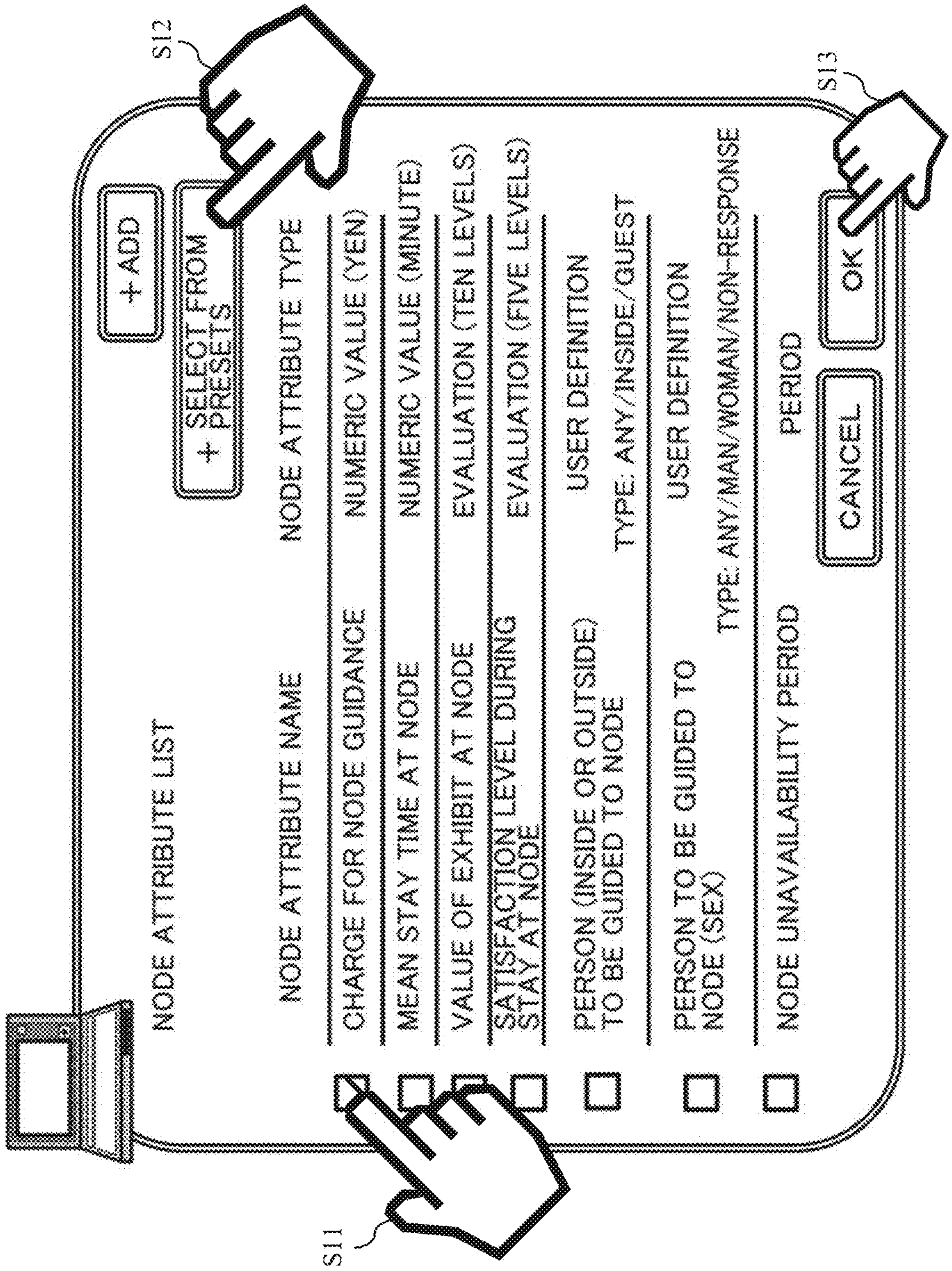
FIG. 16 is an explanatory drawing showing a specific example of generation and storage processing of node attribute definition information stored in the node-attribute definition storage unit.

For example, when a node attribute definition to be registered in the node-attribute definition storage unit 121 is selected from the displayed preset data by the user (operator), as shown in FIG. 16, a check box of displayed data is first touched (clicked) to be selected in step S11. Thereafter, "Select from presets" is touched (clicked) in step S12, and then "OK" is touched in step S13.

When multiple items of data are selected, multiple check boxes are touched (clicked) to be selected in step S11, and then the processing of step S12 and subsequent steps is performed.

Through these steps of processing, a node attribute definition selected from the displayed preset data can be registered in the node-attribute definition storage unit 121.

Figure 17:
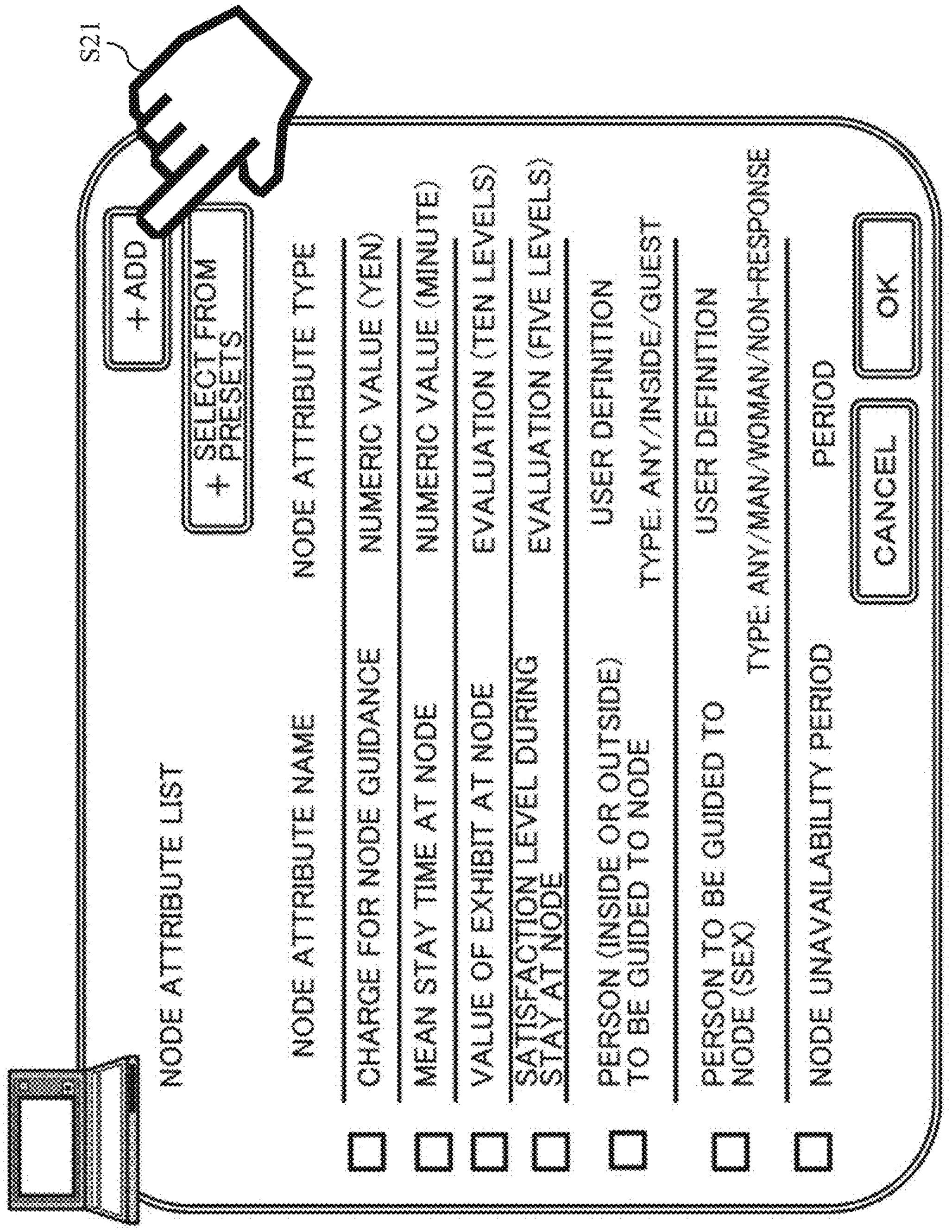
FIG. 17 is an explanatory drawing showing a specific example of generation and storage processing of node attribute definition information stored in the node-attribute definition storage unit.

Moreover, when an additional node attribute definition is registered in the node-attribute definition storage unit 121, as shown in FIG. 17, "Add" is touched (clicked) in step S21.

This processing displays a UI for additional processing of the attribute definition information.

Figure 18:
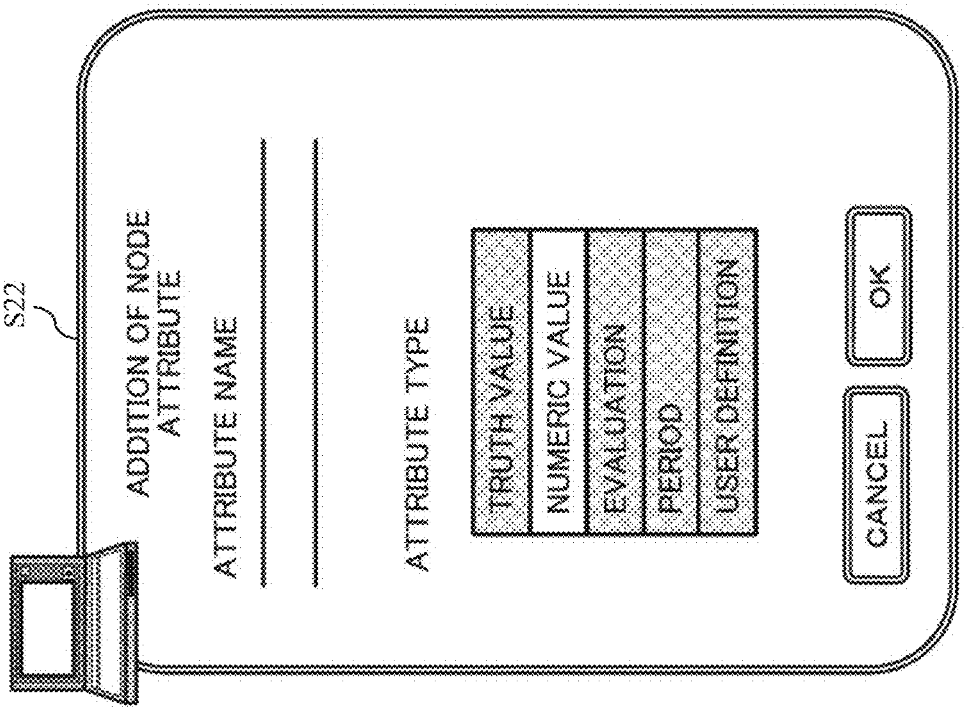
FIG. 18 is an explanatory drawing showing a specific example of generation and storage processing of node attribute definition information stored in the node-attribute definition storage unit.

A UI shown in step 22 of FIG. 18 is a display example of the UI for additional processing of the attribute definition information.

The UI in FIG. 18 displays the entry field of an attribute name and the options of attribute types.

The user (operator) can add any attribute definition by using the attribute definition information addition UI.

Figure 19:
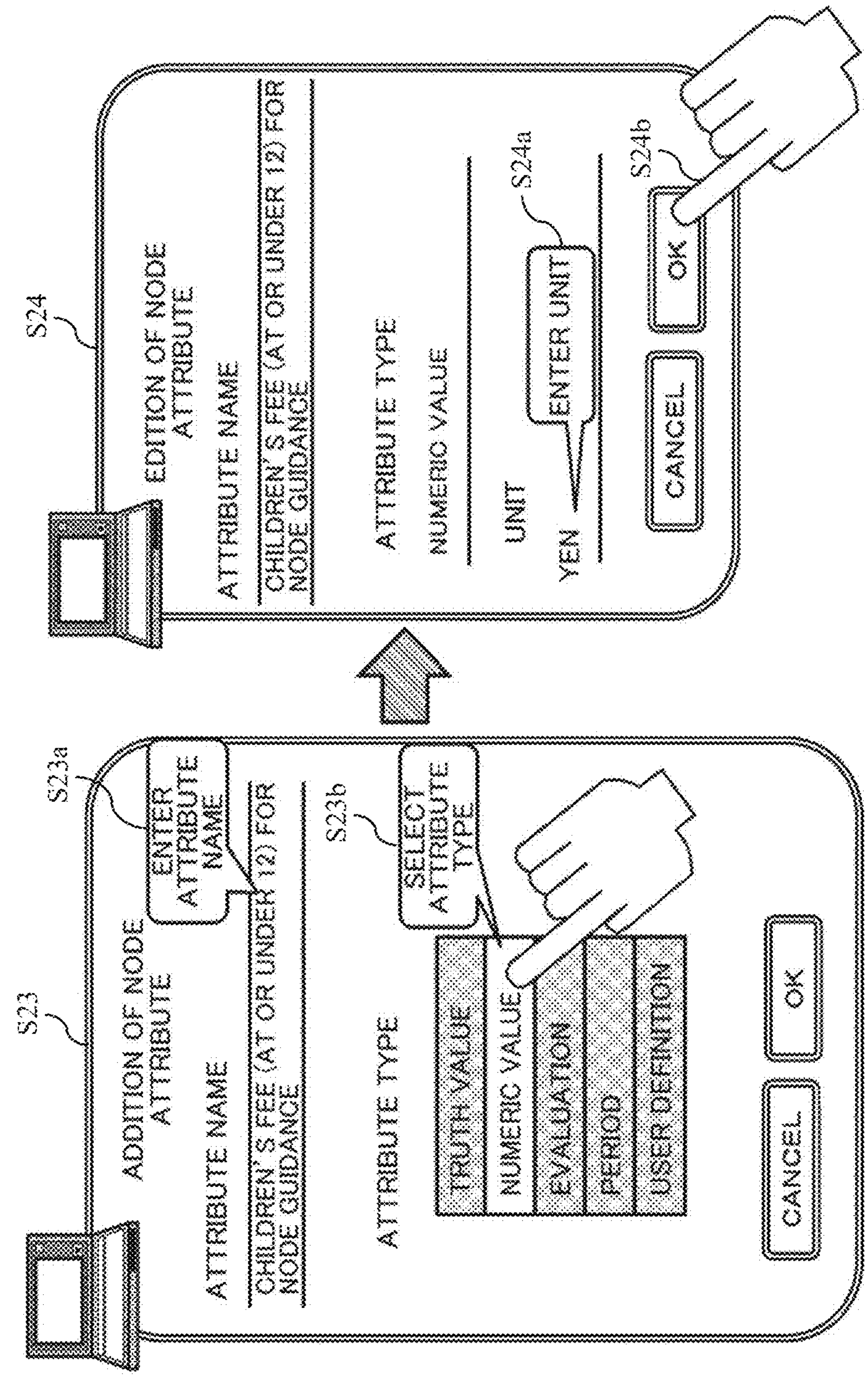
FIG. 19 is an explanatory drawing showing a specific example of generation and storage processing of node attribute definition information stored in the node-attribute definition storage unit.

FIG. 19 is an explanatory drawing of a sequence example of processing in which the user adds an attribute definition by using the attribute definition information addition UI.

The example shown in FIG. 19 indicates attribute name="Children's fee (at or under 12) for node guidance"

FIG. 19 shows a processing sequence of adding the attribute definition of the attribute name.

In step S23*a*, the user (operator) enters an attribute name.

The example of FIG. 19 indicates attribute name="Children's fee (at or under 12) for node guidance" FIG. 19 shows an example in which the attribute name has been entered.

In step S23*b*, the user (operator) selects an attribute type.

The example of FIG. 19 indicates "numeric value" selected from attribute type options="truth value, numeric value, evaluation, period, user definition."

In step S24*a*, the user (operator) enters an attribute type=the unit of evaluation. The example of FIG. 19 indicates "yen" entered as the unit of "numeric value."

Finally, in step S24*b*, the user (operator) touches (clicks) "OK."

Through these steps of processing, additional node attribute definitions, that is, attribute name="Children's fee (at or under 12) for node guidance"

attribute type="numeric value"

attribute type=the unit of "numeric value"="yen"

These additional node attribute definitions are registered in the node-attribute definition storage unit 121.

Figure 20:
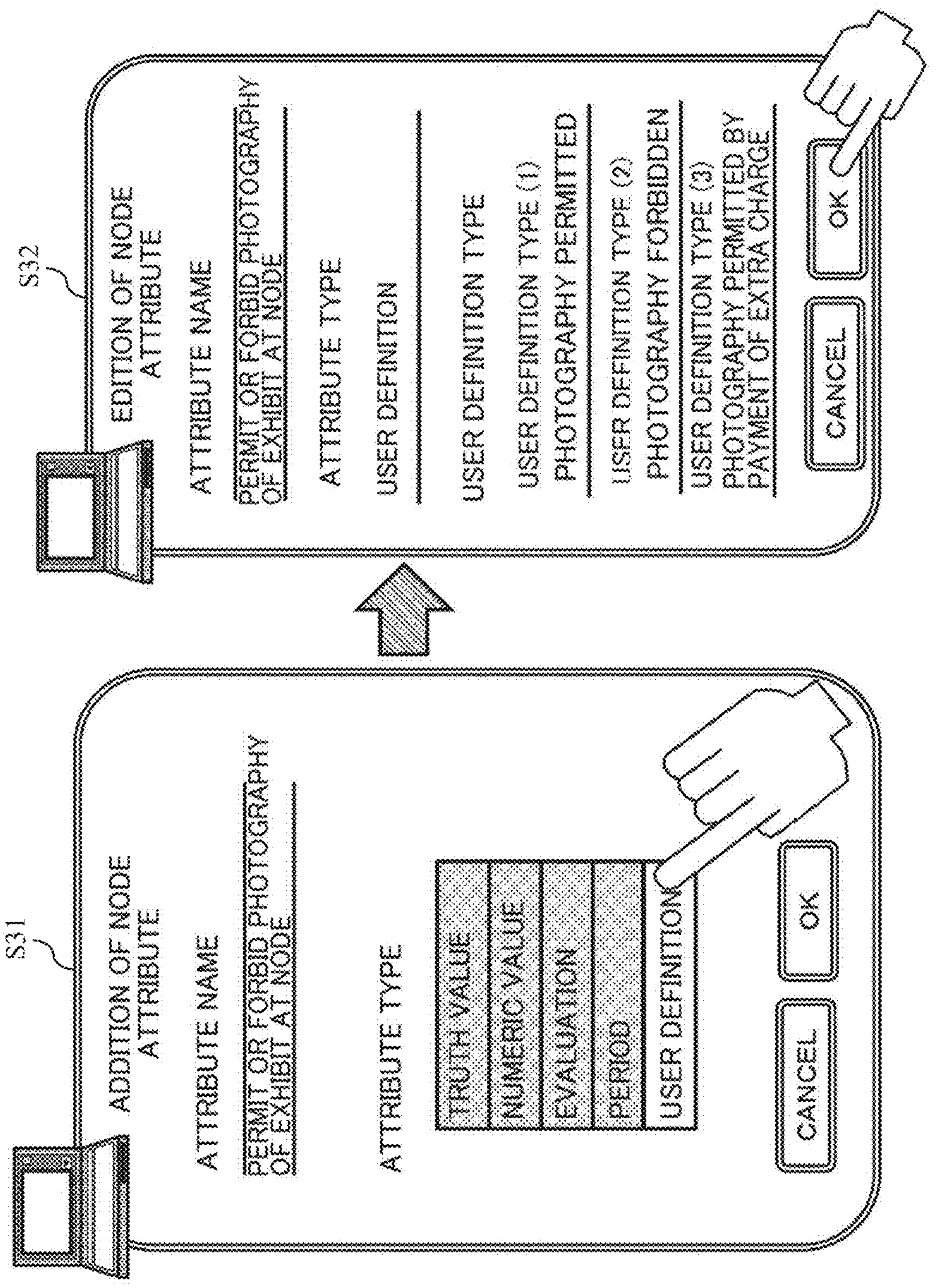
FIG. 20 is an explanatory drawing showing a specific example of generation and storage processing of node attribute definition information stored in the node-attribute definition storage unit.

FIG. 20 shows a processing example of addition of an attribute definition different from that of FIG. 19.

The example shown in FIG. 20 indicates attribute name="permit or forbid photography of exhibit at node" FIG. 20 shows a processing sequence of adding the attribute definition of the attribute name.

In step S31, the user (operator) enters:

attribute name="permit or forbid photography of exhibit at node"

The user (operator) then selects an attribute type.

The example of FIG. 20 indicates:

"user definition" selected from attribute type options="truth value, numeric value, evaluation, period, user definition"

In step S32, the user (operator) enters a specific definition type of attribute type=user definition.

In the example of FIG. 20, three user definition types are entered as the definition types of attribute type="user definition" as follows:

user definition type (1)=photography permitted user definition type (2)=photography forbidden user definition type (3)=photography permitted by payment of extra charge Finally, the user (operator) touches (clicks) "OK."

Through these steps of processing, additional node attribute definitions, that is, attribute name="permit or forbid photography of exhibit at node"

attribute type="user definition"

attribute type=user definition type of "user definition"

user definition type (1)=photography permitted user definition type (2)=photography forbidden user definition type (3)=photography permitted by payment of extra charge These additional node attribute definitions are registered in the node-attribute definition storage unit 121.

Figure 21:
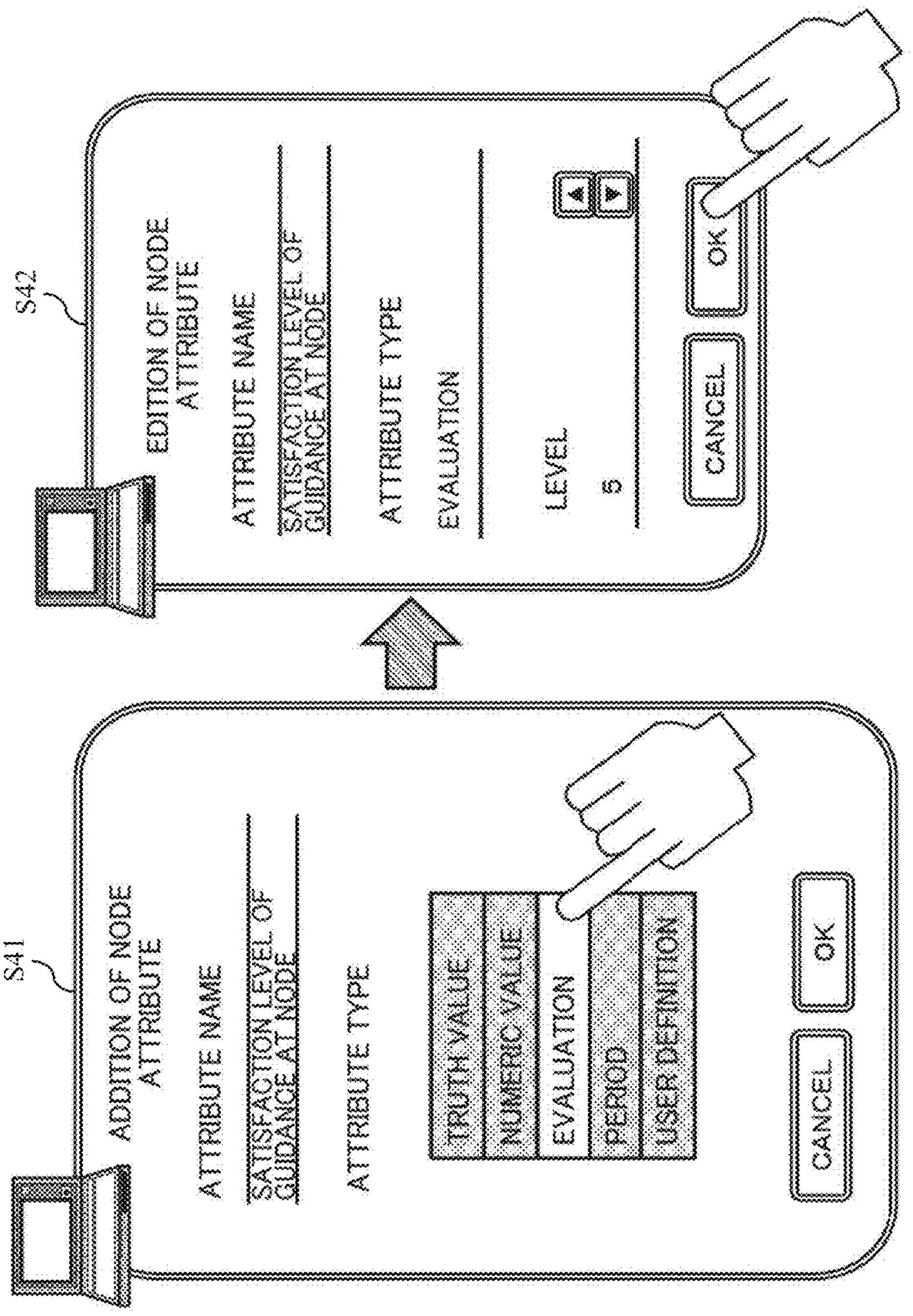
FIG. 21 is an explanatory drawing showing a specific example of generation and storage processing of node attribute definition information stored in the node-attribute definition storage unit.

FIG. 21 shows a processing example of addition of an attribute definition different from those of FIGS. 19 and 20.

The example shown in FIG. 21 indicates attribute name="satisfaction level of guidance at node"

FIG. 21 shows a processing sequence of adding the attribute definition of the attribute name.

In step S41, the user (operator) enters:

attribute name="satisfaction level of guidance at node"

The user (operator) then selects an attribute type.

In the example of FIG. 21,

"evaluation" is selected from attribute type options="truth value, numeric value, evaluation, period, user definition."

In step S42, the user (operator) enters an attribute type=the number of evaluation levels.

In the example of FIG. 21,

"5" is entered as the number of evaluation levels of "evaluation."

Finally, the user (operator) touches (clicks) "OK."

Through these steps of processing, additional node attribute definitions, that is, attribute name="satisfaction level of guidance at node"

attribute type="evaluation"

attribute type=the number of levels of "evaluation"=5

These additional node attribute definitions are registered in the node-attribute definition storage unit 121.

Through this processing, the user (operator) can register various node attribute definitions in the node-attribute definition storage unit 121.

The processing example using the UI described with reference to FIGS. 15 to 21 is an example of registration processing of node attribute definitions in the node-attribute definition storage unit 121.

The registration processing of path attribute definitions in the path-attribute definition storage unit 122 can be performed using almost the same UI as the UI described with reference to FIGS. 15 to 21. The display data of the UI is changed from node attributes to path attributes.

[5. Specific Example of Node Attribute Setting Processing]

A specific example of node attribute setting processing will be described below.

As described with reference to FIGS. 15 to 21, the user (operator) generates various node attribute definitions by using the UI displayed on the display unit of the information processing device 100 and stores the node attribute definitions in the node-attribute definition storage unit 121.

At the completion of the generation and storage processing of the node attribute definitions, the user (operator) can perform processing for setting node attributes for respective actual nodes.

Also in the case of path attributes, at the completion of the generation of path attribute definitions and the storage processing of the generated path attribute definitions in the path-attribute definition storage unit 122, the user (operator) can perform processing for setting path attributes for respective actual paths.

Referring to FIG. 22, a specific example of processing for setting node attributes for respective nodes will be described below.

As described with reference to FIG. 9, the node attribute setting unit 113 of the information processing device 100 sets a node attribute for each node on the basis of data (node attribute information) input by the user (operator) through the UI unit (input unit & display unit) 101 and stores the setting information in the node attribute storage unit 123.

The user (operator) inputs and registers node attributes for respective nodes through the UI unit (input unit & display unit) 101 of the information processing device 100.

The UI unit (input unit & display unit) 101 is available as, for example, a UI unit (input unit & display unit) in the form of a touch panel serving as the display unit of the information processing device 100. A UI (user interface) enabling data entry is displayed on the display unit, and the user (operator) performs various operations on the displayed UI, so that node attributes can be registered.

FIG. 22 shows an example of the UI displayed on the display unit of the information processing device 100 during setting processing of node attributes. The UI is, for example, a UI generated by a node-attribute definition generation application executed by the node attribute setting unit 113 of the data processing unit 110 of the information processing device 100.

The UI in FIG. 22 is composed of the same table as in the example of the node attributes stored in the node attribute storage unit 123 described with reference to FIG. 13. In other words, the UI has the input regions of the following node attributes in correlation with nodes (node identifiers A, B, C, . . . ) having node attributes to be set.

(a) Node attribute 01 (charge for node guidance)

(b) Node attribute 02 (stay time at node)

(c) Node attribute 03 (value of exhibit)

(d) Node attribute 04 (satisfaction level of node)

(e) Node attribute 05 (person (inside or outside) to be guided)

(f) Node attribute 06 (person to be guided (sex))

(g) Node attribute 07 (unavailable period)

The user sequentially inputs the attribute data of nodes (nodes A, B, C, . . . ) in the table shown on the UI.

The data input by the user (operator) is input to the node attribute setting unit 113 of the data processing unit 110 of the information processing device 100, and the node attribute setting unit 113 sets node attributes for the nodes on the basis of the input data and stores the setting information in the node attribute storage unit 123.

The information processing device may be configured such that node attributes 01, 02, and 03 and other node attributes in FIG. 22 are all input by the user. Alternatively, values calculated using the questionnaire survey results of users or sensing information about facial expressions may be set for some of the node attributes. Moreover, the information processing device may be configured to record values automatically calculated on the basis of another node attribute information.

For example, the information processing device may be configured such that the node attribute 04 "satisfaction level of node" is set at a value automatically calculated by collecting the questionnaire survey results of users or sensing information about facial expressions.

Furthermore, the information processing device may be configured such that the node attribute 03 "value of exhibit" is set at a value automatically calculated on the basis of the node attribute 04 "satisfaction level of node."

For example, if "satisfaction level of node" is changed on the basis of feedback information from the user, "value of exhibit" is also changed accordingly.

Such node attribute information can be used for changing and updating the guide route of the robot 10.

For example, in the creation of a guide route of equal value, when the value of an exhibit corresponding to a node is changed, the value of the existing guide route is also changed according to the change of value. When the value of the existing guide route is changed thus, the guide route is changed to keep the value of the guide route.

As described above with reference to FIG. 22, the user (operator) can enter the node attribute of each node through the UI (user interface) displayed on the display unit of the information processing device 100. These items of input data are stored and registered in the node attribute storage unit 123 through processing by the node attribute setting unit 113 of the data processing unit 110 of the information processing device 100.

The processing example using the UI described with reference to FIG. 22 is a registration processing example of node attributes in the node attribute storage unit 123.

The registration processing of path attributes in the path attribute storage unit 124 can also be performed using almost the same UI as the UI described with reference to FIG. 22. The display data of the UI is changed from node attributes to path attributes.

[6. Specific Example of Guide Route Creation Processing]

A specific example of guide route creation processing will be described below.

As described with reference to FIG. 9, the guide route creation unit 115 of the data processing unit 110 of the information processing device 100 creates the optimal guide route of the robot 10 on the basis of data (guide route conditions) input through the UI unit (input unit & display unit) 101.

The guide route creation unit 115 creates the optimal guide route of the robot 10 with reference to attribute information about nodes in the node attribute storage unit 123 and attribute information about paths in the path attribute storage unit 124.

The guide route information generated by the guide route creation unit 115 is transmitted to the robot 10 via the communication unit 140 of the information processing device 100. The robot 10 stores, in the storage unit, the guide route information received from the information processing device 100 and performs processing including traveling, stop, and guidance.

The following specific example describes processing performed by the guide route creation unit 115 of the data processing unit 110 of the information processing device 100 according to the present disclosure, that is, processing for creating the optimal guide route of the robot 10 on the basis of input data (guide route conditions) of the user (operator).

Figure 23:
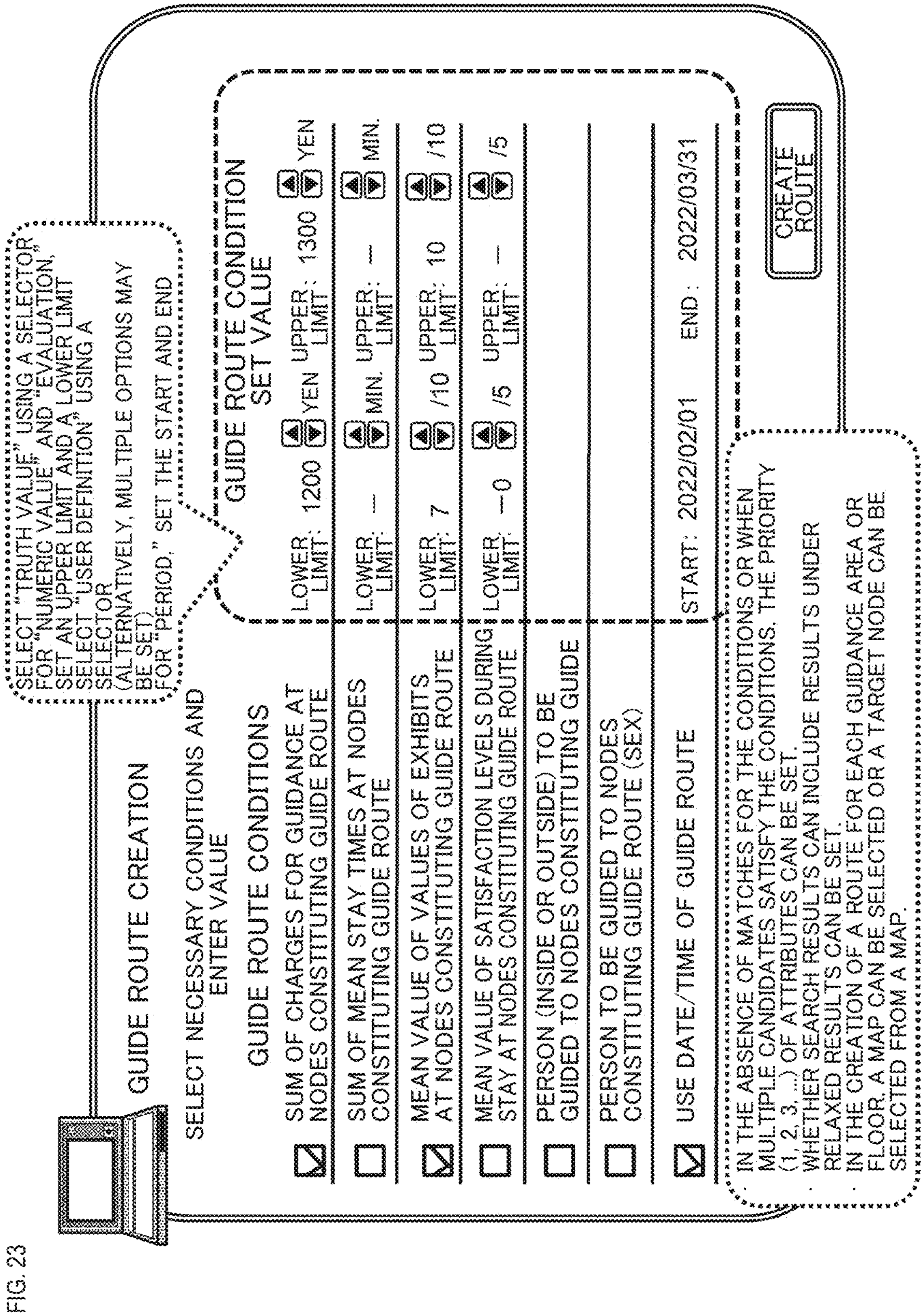
FIG. 23 is an explanatory drawing showing an example of a UI displayed on the display unit of the information processing device during the processing of guide route creation.

FIG. 23 shows an example of the UI displayed on the display unit of the information processing device during the processing of guide route creation. The UI is, for example, a UI generated by a guide route creation application executed by the guide route creation unit 115 of the data processing unit 110 of the information processing device 100.

The UI in FIG. 23 is an example of a UI for performing processing for setting the route conditions of a created guide route.

As settable route conditions, the following conditions are displayed:

(a) Sum of charges for guidance at nodes constituting guide route (b) Sum of mean stay times at nodes constituting guide route (c) Mean value of values of exhibits at nodes constituting guide route (d) Mean value of satisfaction levels during stay at nodes constituting guide route (e) Person (inside or outside) to be guided to nodes constituting guide route (f) Person to be guided to nodes constituting guide route (sex)

(g) Use date/time of guide route

The user (operator) first selects route conditions to be set as the route conditions of the created guide route, from the route conditions (a) to (g). The user (operator) selects the route conditions by putting checkmarks in check boxes on the left of the route conditions to be selected.

Thereafter, a set value for each route condition is entered in the field of "guide route condition set value" on the right of the selected route condition.

For example, for the guide route condition="(a) sum of charges for guidance at nodes constituting guide route," the following values are entered:

a lower limit = 1200 yen, an upper limit = 1300 yen

The route condition is condition setting processing for creating a guide route with "(a) sum of charges for guidance at nodes constituting guide route" in the range of 1200 to 1300 yen.

Additionally, for the guide route condition="(c) mean value of values of exhibits at nodes constituting guide route," the following values are entered:

a lower limit = 7/10, an upper limit = 10/10

The route condition is condition setting processing for creating a guide route with "(c) mean value of values of exhibits at nodes constituting guide route" in the range of 7/10 to 10/10.

The values of exhibits are all rated on a 1-to-10 scale. 7/10 refers to level 7 on the 1-to-10 scale.

Additionally, for the guide route condition="(g) use date/time of guide route," the following values are entered:

start = 02/01/2022, end = 03/31/2022

The route condition is condition setting processing for creating a guide route with "(g) use date/time of guide route" with the start date and time of 02/01/2022 and the end date and time of 03/31/2022.

When the set value of each route condition is entered in the field of "guide route condition set value," "true" or "false" is selected for "truth value" by a selector. For "numeric value" and "evaluation," an upper limit value and a lower limit value are entered. For "user definition," predetermined "user definition type" is selected by a selector. Multiple options may be set. For "period," the start date and time and the end date and time of a period are set.

After these conditions are set, "create route" on the lower right of the UI in FIG. 23 is touched (clicked), so that processing for creating a guide route satisfying the set route conditions is started.

In addition, in the absence of matches for the conditions entered by the user or when multiple route candidates satisfy the conditions, the information processing device is configured to output and present a list of route candidates in a descending order of match rates with the user-entered conditions and order of priority, according to the preset priority (1, 2, 3, . . . ) of each attribute (node attribute, path attribute).

Furthermore, in the absence of matches for the conditions entered by the user, the information processing device may be configured to perform a search under relaxed route search conditions.

Moreover, when a guide route is created for each area or floor of guidance, the information processing device is configured to perform processing for outputting display data for selecting a map corresponding to each location of a created guide route and selecting nodes from the selected map, allowing the user to select options.

When "create route" on the lower right of the UI in FIG. 23 is touched (clicked), processing for creating a guide route satisfying the set route conditions is started. The route creation processing is performed by the guide route creation unit 115 of the data processing unit 110 of the information processing device 100 described with reference to FIG. 9.

On the basis of guide route conditions entered through the UI unit (input unit & display unit) 101 by the user, the guide route creation unit 115 of the data processing unit 110 creates a guide route satisfying the conditions.

The guide route creation unit 115 creates the optimal guide route of the robot 10 with reference to attribute information about nodes in the node attribute storage unit 123 and attribute information about paths in the path attribute storage unit 124 such that the guide route satisfies the conditions entered by the user (operator).

The guide route creation unit 115 creates a guide route satisfying the guide route conditions entered by the user, and outputs detailed information about the created guide route to the UI unit (input unit & display unit) 101.

Figure 24:
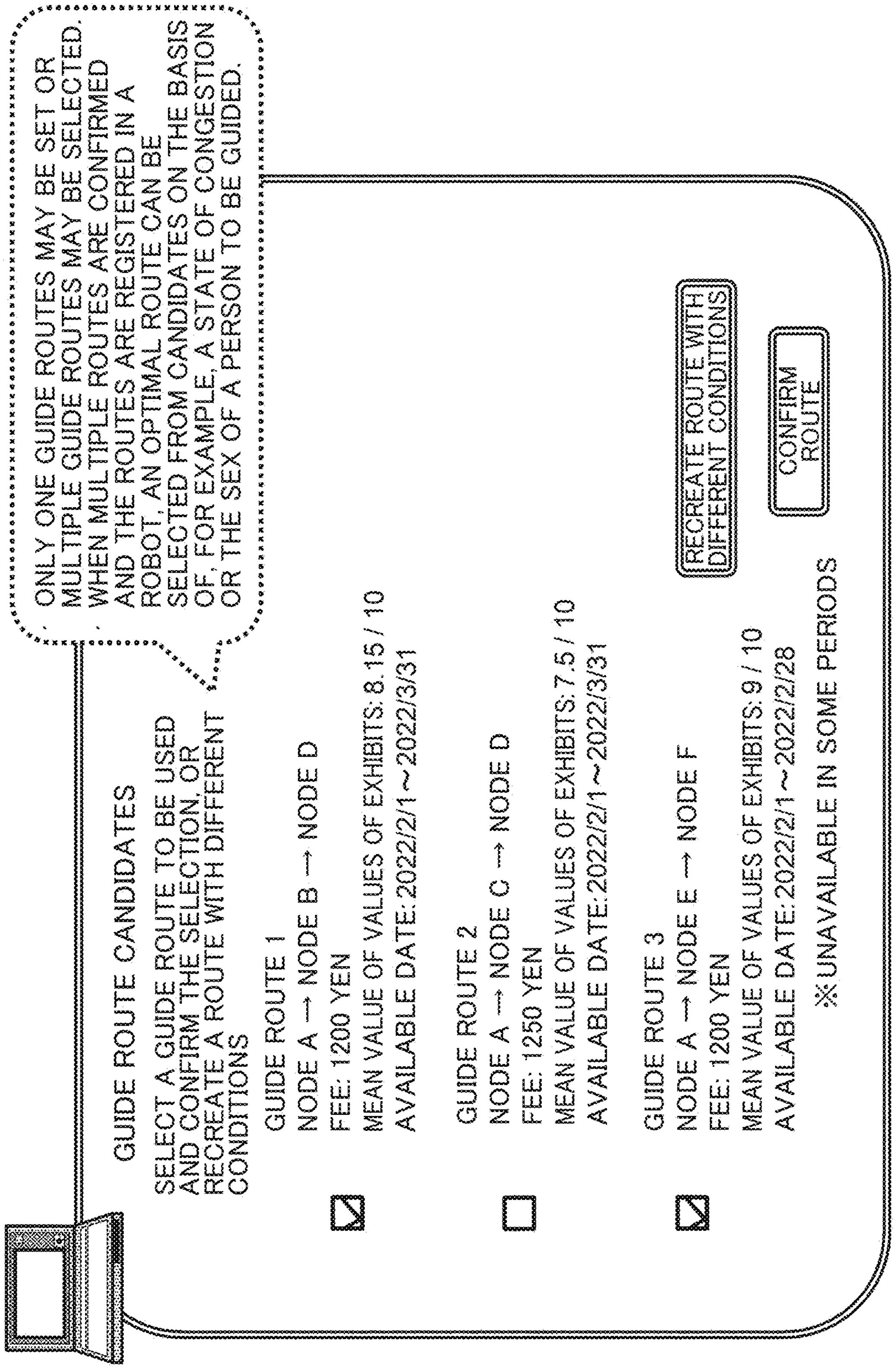
FIG. 24 is an explanatory drawing showing an example of the UI displayed on the display unit of the information processing device during the processing of guide route creation.

FIG. 24 shows a display example of detailed information about the guide route created by the guide route creation unit 115.

The detailed route display example in FIG. 24 shows multiple guide routes satisfying the guide route conditions entered by the user.

As guide routes satisfying the guide route conditions entered by the user, three guide routes are displayed as below.

(Guide Route 1)

Node A→node B→node D

Fee: 1200 yen

Mean value of values of exhibits: 8.15/10

Available date: 2/1/2022 to 3/31/2022

(Guide Route 2)

Node A→node C→node D

Fee: 1250 yen

Mean value of values of exhibits: 7.5/10

Available date: 2/1/2022 to 3/31/2022

(Guide route 3)

Node A→node E→node F

Fee: 1200 yen

Mean value of values of exhibits: 9/10

Available date: 2/1/2022 to 2/28/2022

These three guide routes displayed on the UI are all guide routes that satisfy the guide route conditions entered by the user.

The user (operator) selects the actual guide route to be used from these three guide route candidates.

The user (operator) puts a checkmark in a check box on the left end of the guide route to be selected, and touches (clicks) "create route" on the lower right end. Through this processing, the selected (checked) guide route is transmitted to the robot 10 through the communication unit 140.

The robot 10 stores, in the storage unit, the guide route information received from the information processing device 100 and performs processing including traveling, stop, and guidance.

In the example of FIG. 24, two of the guide routes are selected and thus the two guide routes are stored in the storage unit of the robot 10.

In this case, at least one of the data processing unit of the robot 10 and the data processing unit of the information processing device 100 that communicates with the robot 10 selects optimal one of the guide route candidates on the basis of a state of congestion or the sex of a person to be guided. The robot 10 travels according to the selected guide route.

For example, the information processing device may be configured to transmit selection information, which indicates the desired route of the user (operator), to the robot 10. The robot 10 travels according to the guide route selected according to the selection information.

When "recreate route with different conditions" on the lower right of FIG. 24 is touched (clicked), the UI for condition entry in FIG. 23 is displayed again, enabling the entry of different conditions.

In the example of FIG. 24, multiple guide routes can be selected. Only one of the guide routes may be set to be selected.

[7. Sequence of Processing Performed by Information Processing Device According to Present Disclosure]

A sequence of processing performed by the information processing device according to the present disclosure will be described below.

The information processing device 100 according to the present disclosure is the information processing device 100 described with reference to FIGS. 9 and 10.

The information processing device 100 performs generation processing of a guide route for traveling of the robot 10. Furthermore, the information processing device 100 performs processing for generating and registering nodes and paths necessary for generating a guide route, and processing for setting and registering attributes for the nodes and paths.

Figure 25:
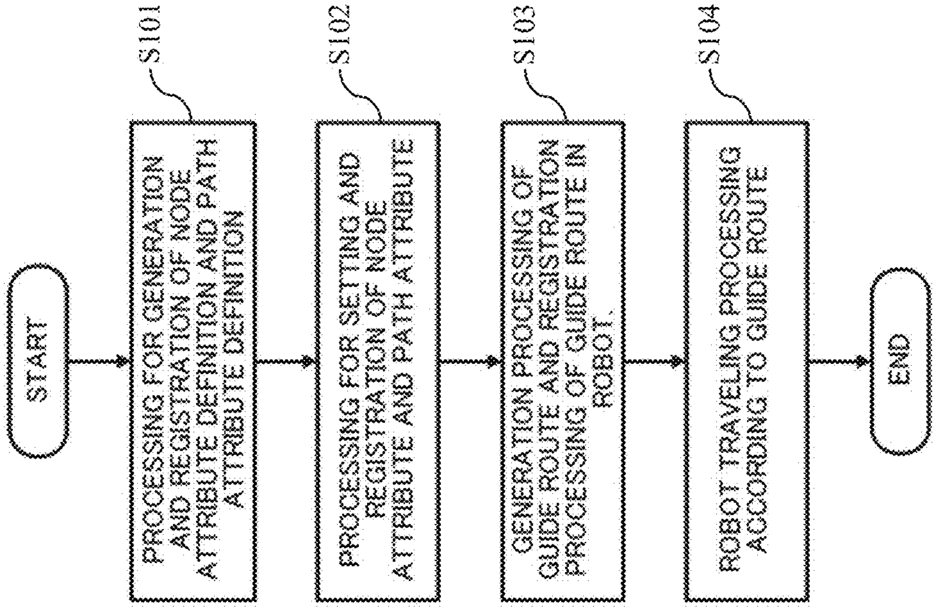
FIG. 25 is a flowchart showing a sequence of processing performed by the information processing device according to the present disclosure.

FIG. 25 shows a flowchart indicating the overall sequence of processing performed by the information processing device 100 of the present disclosure.

The processing according to the flowchart in FIG. 25 and subsequent figures can be performed by the data processing unit 110 of the information processing device 100 according to a program stored in the storage unit of the information processing device 100. The data processing unit 110 includes a processor such as a CPU having the function of executing the program, and can execute the program as program execution processing using the processor.

The processing of each step of the flow in FIG. 25 will be described below.

(Step S101)

First, in step S101, the information processing device 100 performs generation processing and registration processing of a node attribute definition and a path attribute definition.

This processing is processing to be performed by the node-attribute definition generation unit 111 and the path-attribute definition generation unit 112 in the data processing unit 110 of the information processing device 100 illustrated in FIGS. 9 and 10.

The node-attribute definition generation unit 111 generates the node attribute definitions of nodes on the basis of user input data (node attribute definition information) and stores the node attribute definitions in the node-attribute definition storage unit 121. Furthermore, the path-attribute definition generation unit 112 performs processing for generating the path attribute definitions of paths on the basis of user input data (path attribute definition information) and storing the path attribute definitions in the path-attribute definition storage unit 122.

These steps of the processing are all performed by the operations of the user (operator) through the UI unit (input unit & display unit) 101 of the information processing device 100.

Specifically, the processing is performed using the UI described with reference to FIGS. 15 to 21.

Figure 26:
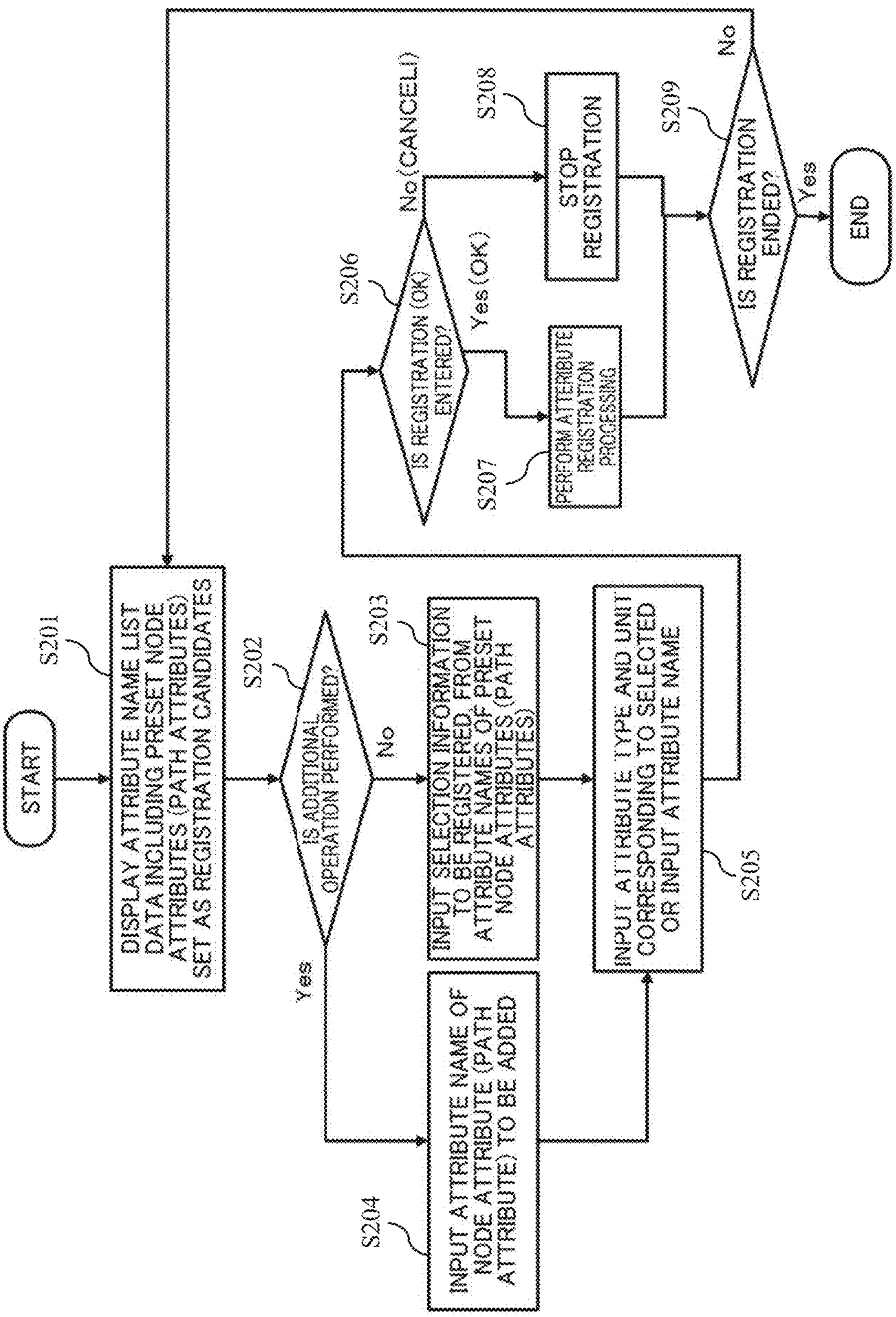
FIG. 26 is a flowchart showing a sequence of processing performed by the information processing device according to the present disclosure.

A detailed sequence of the processing of step S101 will be described later with reference to the flowchart of FIG. 26.

Through the processing of step S101, generated node attribute definition information is stored in the node-attribute definition storage unit 121 of the information processing device 100, and path attribute definition information is stored in the path-attribute definition storage unit 122.

Various kinds of node attribute definition information as described with reference to FIG. 11 are stored in the node-attribute definition storage unit 121.

Specifically, for example, the following node attribute definition information is stored.

Node attribute 01="charge for node guidance"

Node attribute 02="mean stay time at node"

Node attribute 03="value of exhibit at node"

Node attribute 04="satisfaction level during stay at node"

Node attribute 05="person (inside or outside) to be guided to node"

Node attribute 06="person to be guided to node (sex)"

Node attribute 07="node unavailability period"

Node attribute 08="node availability period limited to staff member"

Moreover, various kinds of path attribute definition information as described with reference to FIG. 12 are stored in the path-attribute definition storage unit 122. Specifically, for example, the following node attribute definition information is stored.

Path attribute 01="Distance of path"

Path attribute 02="Moving time of path"

Path attribute 03="if baby buggy and wheelchair are usable or not on path"

(Step S102)

After the completion of the generation processing and registration processing of the node attribute definition and the path attribute definition in step S101, the information processing device 100 can perform the processing of step S102.

The information processing device 100 performs the setting processing of node attributes and path attributes in step S102.

This processing is processing to be performed by the node attribute setting unit 113 and the path attribute setting unit 114 in the data processing unit 110 of the information processing device 100 illustrated in FIGS. 9 and 10.

The node attribute setting unit 113 performs processing for setting a node attribute for each node on the basis of user input data (node attribute information) and storing the attribute in the node attribute storage unit 123. Furthermore, the path attribute setting unit 114 also performs processing for setting a path attribute for each path on the basis of user input data (path attribute information) and storing the attribute in the path attribute storage unit 124.

The nodes and paths to be subjected to attribute setting are nodes and paths that are recorded in the map information 131 of the region information storage unit 130 described with reference to FIGS. 9 and 10.

As described with reference to FIG. 6, the positions or the like of the nodes and paths set in the traveling region of the robot 10 are recorded in the map information 131.

The attribute setting processing on the nodes and paths in step S102 is performed by the operations of the user (operator) through the UI unit (input unit & display unit) 101 of the information processing device 100.

Specifically, the processing is performed using, for example, the UI described with reference to FIG. 22.

As described above, the UI in FIG. 22 is a UI having the input regions of the following node attributes in correlation with nodes (node identifiers A, B, C, . . . ) having node attributes to be set.

(a) Node attribute 01 (charge for node guidance)

(b) Node attribute 02 (stay time at node)

(c) Node attribute 03 (value of exhibit)

(d) Node attribute 04 (satisfaction level of node)

(e) Node attribute 05 (person (inside or outside) to be guided)

(f) Node attribute 06 (person to be guided (sex))

(g) Node attribute 07 (unavailable period)

The user sequentially inputs the attribute data of nodes (nodes A, B, C, . . . ) in the table shown on the UI. The input data is stored in the node attribute storage unit 123 by the node attribute setting unit 113.

The registration processing of path attributes in the path attribute storage unit 124 is also performed using almost the same UI as the UI described with reference to FIG. 22.

Through the processing of step S102, various kinds of node attribute information about nodes are recorded in the node attribute storage unit 123. For example, the following attribute information is recorded in correlation with nodes (node identifiers, node names) as described with reference to FIG. 13.

(a) Node attribute 01 (charge (yen))

(b) Node attribute 02 (stay time (minute))

(c) Node attribute 03 (value of exhibit)

(d) Node attribute 04 (satisfaction level)

(e) Node attribute 05 (person (inside or outside) to be guided)

(f) Node attribute 06 (person to be guided (sex))

(g) Node attribute 07 (unavailable period)

(h) Node attribute 08 (available period limited to staff member)

In the path attribute storage unit 124, various kinds of path attribute information about paths are recorded. For example, as described with reference to FIG. 14, the following path attribute information is recorded in correlation with paths (path identifiers, path names).

(a) Path attribute 01 (distance (m))

(b) Path attribute 02 (moving time (second))

(c) Path attribute 03 (baby buggy, wheelchair)

(Step S103)

After the completion of the attribute setting processing on nodes and paths in step S102, the processing of step S103 can be performed.

In step S103, the information processing device 100 performs generation processing of a guide route and registration processing of the generated guide route in the robot.

This processing is performed by the guide route creation unit 115 in the data processing unit 110 of the information processing device 100 illustrated in FIGS. 9 and 10.

The guide route creation unit 115 creates the optimal guide route of the robot 10 on the basis of data (guide route conditions) input through the UI unit (input unit & display unit) 101.

The guide route creation unit 115 creates the optimal guide route of the robot 10 with reference to genus information about nodes in the node attribute storage unit 123 and attribute information about paths in the path attribute storage unit 124.

The guide route creation processing in step S103 is performed by the operations of the user (operator) through the UI unit (input unit & display unit) 101 of the information processing device 100.

Specifically, the processing is performed using, for example, the UI described with reference to FIGS. 23 and 24.

For example, the user (operator) sets any route conditions by using the route condition setting UI described with reference to FIG. 23. For example, as described with reference to FIG. 23, conditions can be set for the following items:

(a) Sum of charges for guidance at nodes constituting guide route (b) Sum of mean stay times at nodes constituting guide route (c) Mean value of values of exhibits at nodes constituting guide route (d) Mean value of satisfaction levels during stay at nodes constituting guide route (e) Person (inside or outside) to be guided to nodes constituting guide route (f) Person to be guided to nodes constituting guide route (sex)

(g) Use date/time of guide route

The guide route creation unit 115 of the information processing device 100 creates a guide route satisfying the route conditions entered by the user (operator).

The guide route creation unit 115 creates the guide route satisfying the user (operator) input conditions with reference to attribute information about nodes in the node attribute storage unit 123 and attribute information about paths in the path attribute storage unit 124.

For example, as described with reference to FIG. 24, the created guide route is output to the UI unit (input unit & display unit) 101.

The user (operator) can select any guide route from output guide routes as a route to be registered in the robot 10. The selected guide route information is transmitted to the robot 10 through the communication unit 140 and is stored in the storage unit of the robot 10.

The processing of step S103 will be specifically described later with reference to the flowchart of FIG. 27.

(Step S104)

Finally, in step S104, the robot 10 performs processing including traveling, stop, and guidance according to the guide route information generated by the information processing device 100.

The processing of step S104 is processing to be performed by the robot 10 instead of the information processing device 100.

As described above, the information processing device 100 performs the following three steps:

(Step S101) generation and registration processing of a node attribute definition and a path attribute definition (Step S102) setting and registration processing of node attributes and path attributes for nodes and paths according to the attribute definitions of registered node attributes and path attributes (Step S103) generation of a guide route satisfying route conditions by using setting information about node attributes and path attributes Through this processing, even when the attribute of a node or the attribute of a path is changed, a route satisfying the conditions set by the user can be quickly and reliably generated.

The processing of step S101 in the flow of FIG. 25, that is, a detailed sequence of the generation processing and registration processing of the node attribute definition and the path attribute definition will be described below with reference to the flowchart of FIG. 26.

The processing according to the flow of FIG. 25 is processing to be performed by the node-attribute definition generation unit 111 and the path-attribute definition generation unit 112 in the data processing unit 110 of the information processing device 100 illustrated in FIGS. 9 and 10. For example, the processing is performed using the UI described with reference to FIGS. 15 to 21.

(Step S201)

First, in step S201, the information processing device 100 displays attribute name list data, which includes preset node attributes (path attributes) set as registration candidates, on the UI unit (input unit & display unit) 101.

In step S201, data displayed on the UI unit (input unit & display unit) 101 is specifically display data shown in FIG. 15.

(Step S202)

In step S202, the information processing device 100 determines the presence or absence of "additional" operation of an operation unit by the user.

When "additional" operation of the operation unit by the user is not detected, the process advances to step S203.

When "additional" operation of the operation unit by the user is detected, the process advances to step S204.

(Step S203)

When "additional" operation of the operation unit by the user is not detected, in step S203, the information processing device 100 inputs selection information to be registered, the selection information being selected from the attribute names of the preset node attributes (path attributes) by the user.

This processing is, for example, the processing described with reference to FIG. 16 and is performed by processing in which the user touches (clicks) a check box corresponding to an attribute name.

(Step S204)

When "additional" operation of the operation unit by the user is detected in step S202, the information processing device 100 in step S204 inputs the attribute name of a node attribute (path attribute) to be added.

This processing is, for example, processing corresponding to the processing of step S23*a* in FIG. 19.

The user can input any attribute name to the UI.

(Step S205)

Subsequently, in step S205, an attribute type and a unit or the like are input, the attribute type corresponding to any one of the attribute name selected from the preset data in step S203 and the additional attribute name input by the user in step S204.

This processing corresponds to, for example, the processing of steps S23*b* to S24 in FIG. 19 and the processing in FIGS. 20 and 21.

(Step S206)

In step S206, it is determined whether registration (OK) has been performed by the user.

Specifically, for example, it is determined whether the "OK" button in (S24*b*) of FIG. 19 has been clicked.

When it is determined that registration (OK) has been performed by the user, the process advances to step S207.

When it is determined that registration (OK) has not been performed by the user ("CANCEL" button has been clicked), the process advances to step S208.

(Step S207)

In step S206, when it is determined that registration (OK) has been performed by the user, the process advances to step S207.

In this case, in step S207, the information processing device 100 stores the node attribute definition or the path attribute definition in the storage unit according to information entered by the user.

Through this processing, node attribute definition information generated according to the information entered by the user is stored in the node-attribute definition storage unit 121 of the information processing device 100, and path attribute definition information generated according to the information entered by the user is stored in the path-attribute definition storage unit 122.

The processing of step S103 in the flowchart of FIG. 25, that is, a detailed sequence of the generation processing of a guide route and the registration processing of the generated guide route in the robot will be described below with reference to the flowchart of FIG. 27.

Figure 27:
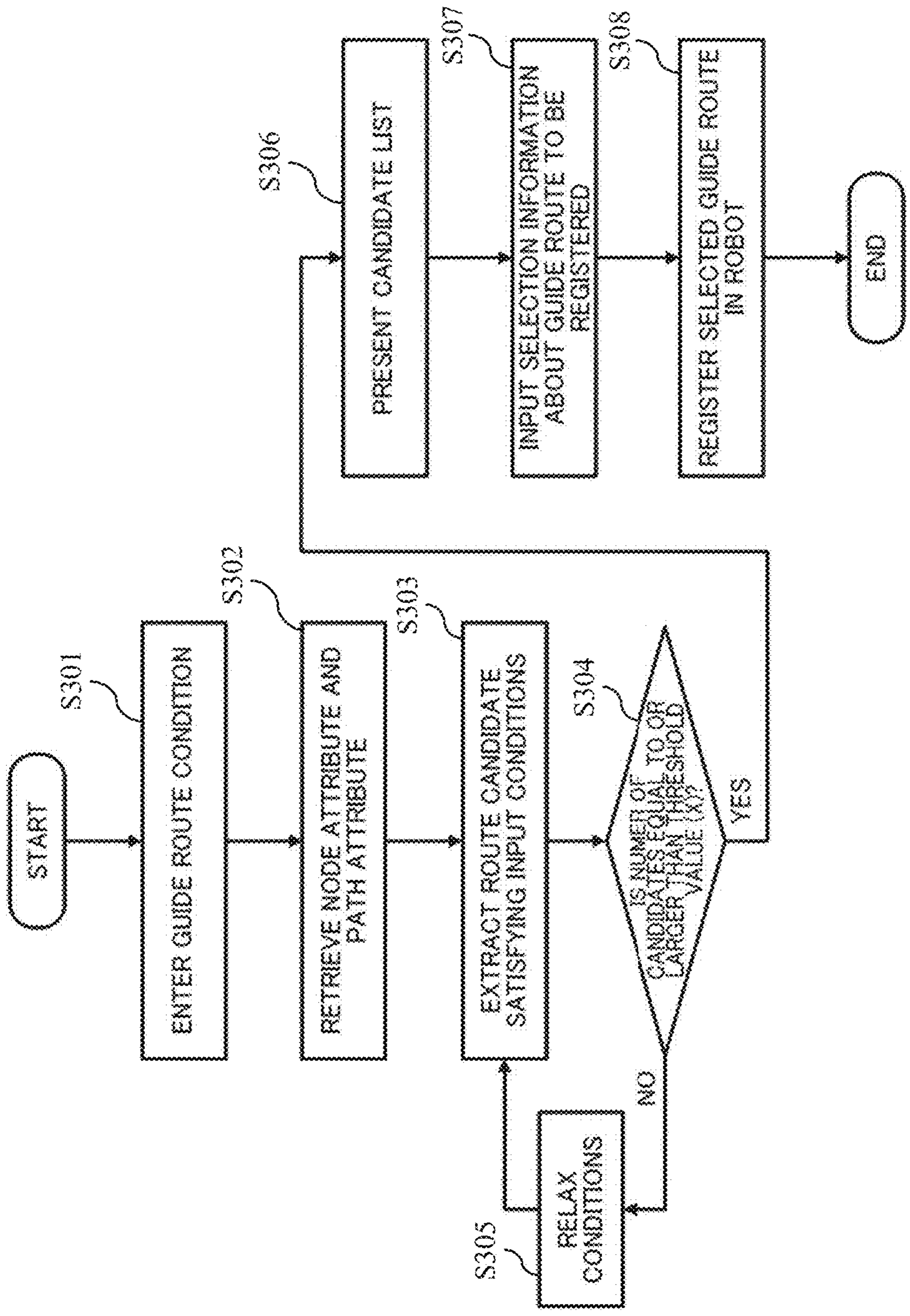
FIG. 27 is a flowchart showing a sequence of processing performed by the information processing device according to the present disclosure.

As described above, the guide route creation processing in step S103 of the flowchart of FIG. 25 is performed after processing in the following two steps:

(Step S101) generation and registration processing of a node attribute definition and a path attribute definition (Step S102) setting and registration processing of node attributes and path attributes for nodes and paths according to the attribute definitions of registered node attributes and path attributes The flowchart in FIG. 27 is processing performed by the guide route creation unit 115 in the data processing unit 110 of the information processing device 100 illustrated in FIGS. 9 and 10.

The processing of the steps of the flow in FIG. 27 will be sequentially described below.

(Step S301)

First, in step S301, the guide route condition is entered.

This processing is processing using the route condition setting UI described with reference to FIG. 23. The user (operator) can set any route condition.

(Step S302)

In S302, the guide route creation unit 115 in the data processing unit 110 of the information processing device 100 retrieves setting information about the node attributes and path attributes for nodes and paths, the node and path attributes being generated in step S102 of FIG. 25 and are stored in the storage unit.

In other words, the guide route creation unit 115 retrieves the node attributes and path attributes that are stored in the node attribute storage unit 123 and the path attribute storage unit 124 of the information processing device 00.

Specifically, for example, the guide route creation unit 115 retrieves the node attributes described with reference to FIG. 11 and the path attributes described with reference to FIG. 12.

(Step S303)

In step S303, the guide route creation unit 115 in the data processing unit 110 of the information processing device 100 generates and extracts a guide route satisfying the guide route conditions entered by the user in step S301.

The guide route generation processing is performed with reference to the node attributes of nodes and the path attributes of paths, the node and path attributes being retrieved from the node attribute storage unit 123 and the path attribute storage unit 124 in step S302.

The extraction processing of a guide route that satisfies the user input conditions can be performed by using, for example, existing route search algorithms such as depth-first search processing and breadth-first search processing for finding routes that satisfy the conditions.

If multiple guide routes satisfying the user input conditions can be generated, processing of selecting all routes matching the conditions is performed by using, for example, a full-search algorithm.

(Step S304)

In step S304, the guide route creation unit 115 determines whether the number of guide routes satisfying the user input conditions in step S303 is equal to or larger than a predetermined threshold value (x).

The threshold value (x) may be any number that can be set by the user or a predetermined fixed number.

When the number of guide routes satisfying the user input conditions is equal to or larger than the predetermined threshold value (x), the process advances to step S306.

When the number of guide routes satisfying the user input conditions is smaller than the predetermined threshold value (x), the process advances to step 305.

(Step S305)

In step S304, when it is determined that the number of guide routes satisfying the user input conditions is smaller than the predetermined threshold value (x), the guide route creation unit 115 performs processing for relaxing the guide route conditions in step S305. In other words, processing for relaxing the conditions entered by the user in step S301 is performed.

Thereafter, under the relaxed conditions, the processing for extracting a route satisfying the conditions in step S303 is performed.

A predetermined algorithm is used as a condition relaxing algorithm. For example, when the user specifies multiple conditions, the conditions are relaxed in any order (in the order of ascending priorities when the priorities of attributes are set) to increase candidates.

For example, when the user specifies the condition “user satisfaction level of 9 to 10,” processing for relaxing the condition to “user satisfaction level of 8 to 10” can be performed.

(Step 306)

In the determination processing of step S304, when it is determined that the number of guide routes satisfying the user input conditions is equal to or larger than the predetermined threshold value (x), the process advances to step S306.

In this case, in step S306, the guide route creation unit 115 outputs the list data of guide routes satisfying the user input conditions to the UI unit (input unit & display unit) 101.

For example, as described with reference to FIG. 24, the list data of guide routes satisfying the user input conditions to the UI unit (input unit & display unit) 101.

(Step S307)

In step S307, the guide route creation unit 115 inputs selection information about the guide route to be registered.

In other words, the guide route creation unit 115 inputs selection information selected by the user, from the list data of guide routes satisfying the user input conditions described with reference to FIG. 24.

(Step S308)

Finally, in step S308, the guide route creation unit 115 transmits the guide route information selected in step S307 to the robot 10 through the communication unit 140 and stores the information in the storage unit of the robot 10.

Thereafter, the robot 10 performs processing including traveling, stop, and guidance according to the guide route information generated by the information processing device 100.

In this way, the information processing device 100 according to the present disclosure is configured to generate a guide route satisfying the route conditions with reference to attributes (node attributes, path attributes) corresponding to multiple nodes preset in the traveling region of the robot 10 and paths connecting the nodes, so that a route satisfying the conditions set by the user can be quickly and reliably generated.

When the attribute of a node or the attribute of a path is changed, data in the node attribute storage unit and the path attribute storage unit is sequentially updated, so that a route satisfying the conditions set by the user can be quickly and reliably generated on the basis of latest information.

[8. Hardware Configuration Example of Information Processing Device]

Figure 28:
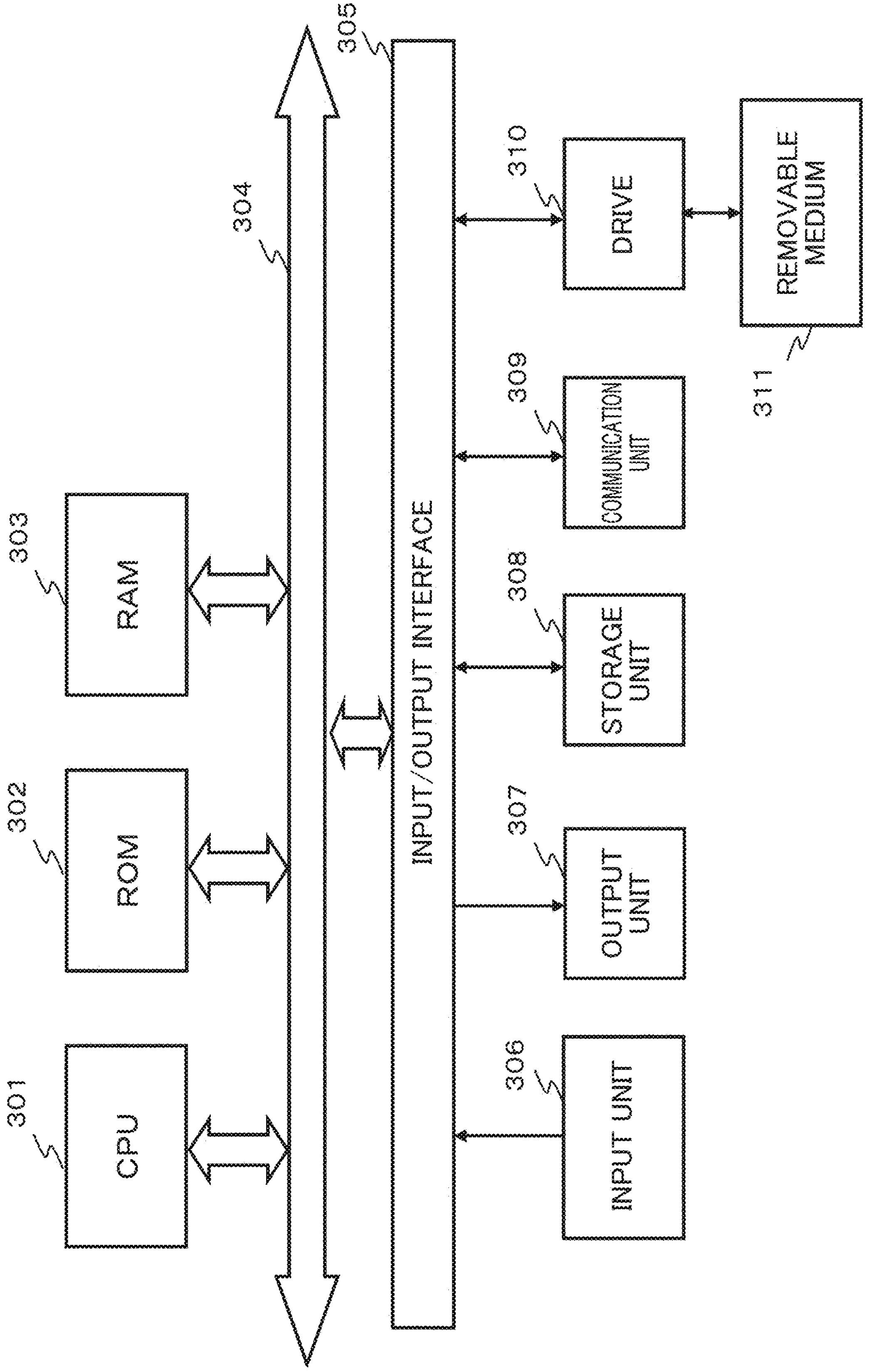
FIG. 28 is an explanatory drawing illustrating an example of the hardware configuration of the information processing device according to the present disclosure.

Referring to FIG. 28, an example of the hardware configuration of the information processing device according to the present disclosure will be described below.

The information processing device is the information processing device 100 described with reference to FIGS. 9 and 10.

A central processing unit (CPU) 301 functions as a data processing unit that executes various types of processing according to programs stored in a read only memory (ROM) 302 or a storage unit 308. For example, the processing according to the sequence described in the embodiment is performed. A random access memory (RAM) 303 stores a program that is executed by the CPU 301 or data. The CPU 301, the ROM 302, and the RAM 303 are connected to one another via a bus 304.

The CPU 301 is connected to an input/output interface 305 via the bus 304, and an input unit 306 including a camera, various switches, a keyboard, a touch panel, a mouse, a microphones, and a user input unit and an output unit 307 including a display and speakers are connected to the input/output interface 305.

The CPU 301 receives input commands and status data or the like from the input unit 306, performs various kinds of processing, and outputs the processing results to, for example, the output unit 307.

The storage unit 308 connected to the input/output interface 305 is composed of, for example, a hard disk or the like, and stores a program executed by the CPU 301 and various types of data. A communication unit 309 functions as a transmission and reception unit for data communications via a network such as the Internet or a local area network, and communicates with an external device.

A drive 310 connected to the input/output interface 305 drives a removable medium 311 such as a magnetic disk, an optical disc, a magneto-optical disc, or a semiconductor memory such as a memory card to perform recording or reading of data.

[9. Summary of Configuration of Present Disclosure]

An embodiment of the present disclosure has been described in detail with reference to a specific embodiment. However, it is obvious to those skilled in the art that the embodiment can be modified or replaced without departing from the gist of the present disclosure. In other words, the present invention has been disclosed according to an illustrative form, but the present disclosure should not be restrictively construed. The gist of the present disclosure should be determined in consideration of the claims.

The technique disclosed in the present specification can be configured as follows:

(1) An information processing device including a guide route creation unit that creates a guide route for guidance provided by a robot, wherein the guide route is a guide route constituted of a plurality of nodes and paths connecting the nodes, and wherein the guide route creation unit retrieves the node attributes of the nodes and the path attributes of the paths in a guide route creation region, and creates a guide route satisfying predetermined route conditions on the basis of the retrieved node attributes and path attributes.

(2) The information processing device according to (1), wherein the route conditions are route conditions entered into the information processing device by a user, and the guide route creation unit retrieves the node attributes of nodes and the path attributes of paths in the guide route creation region, and creates a guide route satisfying the route conditions entered by the user.

(3) The information processing device according to (1) or (2), wherein the node attributes include at least any of a value set for the node, an evaluation value, a guidance time, or a target of guidance, and the guide route creation unit compares at least any of a value set for the node, an evaluation value, a guidance time, or a target of guidance with the conditions set in the route conditions and creates a guide route satisfying the route conditions.

(4) The information processing device according to any one of (1) to (3), wherein the path attributes include any of a path distance, a path moving time, and moving means available on a path, and the guide route creation unit compares at least any of a path distance, a path moving time, and moving means available on a path with the conditions set in the route conditions and creates a guide route satisfying the route conditions.

(5) The information processing device according to any one of (1) to (4), wherein the node attributes include at least any of a node guidance charge set for a node, a node stay time, the value of a node exhibit, a node satisfaction level, and a person to be guided to a node, and the guide route creation unit compares at least any of a node guidance charge set for a node, a node stay time, the value of a node exhibit, a node satisfaction level, and a person to be guided to a node with the conditions set in the route conditions and creates a guide route satisfying the route conditions.

(6) The information processing device according to any one of (1) to (5), wherein the node attributes include at least any of the sales of an item for sale associated with a node, the value of an exhibit associated with a node, and the value of a sightseeing spot or scenery associated with a node, and the guide route creation unit compares at least any of the sales of an item for sale associated with a node, the value of an exhibit associated with a node, and the value of a sightseeing spot or scenery associated with a node with the conditions set in the route conditions and creates a guide route satisfying the route conditions.

(7) The information processing device according to any one of (1) to (6), wherein the guide route creation unit generates the route conditions according to input data entered by the user, and the generated route conditions include at least any of conditions (a) to (d) below:

(a) the sum of charges for guidance at nodes constituting the guide route, (b) the sum of stay times at nodes constituting the guide route, (c) the sum of values of exhibits at nodes constituting the guide route, and (d) the mean value of satisfaction levels at nodes constituting the guide route.

(8) The information processing device according to any one of (1) to (7), wherein when creating a plurality of guide routes satisfying the route conditions, the guide route creation unit outputs list data of the plurality of created guide routes to a display unit.

(9) The information processing device according to any one of (1) to (8), wherein when the number of guide routes satisfying the route conditions is smaller than a predetermined threshold value, the guide route creation unit relaxes the route conditions and creates a guide route satisfying the relaxed route conditions.

(10) The information processing device according to any one of (1) to (9), further including:

a node attribute storage unit that stores the node attributes of nodes; and a path attribute storage unit that stores the path attributes of paths, wherein the guide route creation unit creates a guide route satisfying the route conditions by using the node attributes retrieved from the node attribute storage unit and the path attributes retrieved from the path attribute storage unit.

(11) The information processing device according to any one of (1) to (10), further including:

a node-attribute definition generation unit that generates a node attribute definition as definition information about the node attributes and stores the definition in a storage unit; and a path-attribute definition generation unit that generates a path attribute definition as definition information about the path attributes and stores the definition in the storage unit.

(12) The information processing device according to (11), further including:

a node-attribute definition storage unit that stores the node attribute definition generated by the node-attribute definition generation unit; and a path-attribute definition storage unit that stores the path attribute definition generated by the path-attribute definition generation unit.

(13) The information processing device according to any one of (1) to (12), further including:

a node attribute setting unit that stores the node attributes in the storage unit such that the node attributes are associated with the plurality of nodes respectively in the guide route creation region; and a path attribute setting unit that stores the path attributes in the storage unit such that the path attributes are associated with the respective paths connecting the nodes.

(14) The information processing device according to (13), further including:

a node attribute storage unit that stores the node attributes set for the respective nodes by the node attribute setting unit; and a path attribute storage unit that stores the path attributes set for the respective nodes by the path attribute setting unit.

(15) The information processing device according to any one of (1) to (14), further including a communication unit that transmits, to the robot, the guide route generated by the guide route generation unit.

(16) An information processing method performed in an information processing device, the information processing device including:

a guide route creation unit that creates a guide route for guidance provided by a robot, the guide route being a guide route constituted of a plurality of nodes and paths connecting the nodes, the method comprising, by the guide route creation unit, retrieving the node attributes of the nodes and the path attributes of the paths in a guide route creation region, and creating a guide route satisfying predetermined route conditions on the basis of the retrieved node attributes and path attributes.

(17) A program for causing an information processing device to perform information processing, the information processing device including a guide route creation unit that creates a guide route for guidance provided by a robot, the guide route being a guide route constituted of a plurality of nodes and paths connecting the nodes, wherein the program causes the guide route creation unit to retrieve the node attributes of the nodes and the path attributes of the paths in a guide route creation region, and create a guide route satisfying predetermined route conditions on the basis of the retrieved node attributes and path attributes.

The series of processing described in this specification can be executed by hardware, software, or a composite configuration of both. If the series of processing is to be executed by software, the series of processing can be executed by installing a program recording the processing sequence into a memory in a computer embedded in dedicated hardware, or by installing the program into a general-purpose computer capable of executing various kinds of processing. For example, the program can be pre-recorded on a recording medium. Rather than being installed into a computer from a recording medium, the program can be received via a network such as a local area network (LAN) or the Internet, and installed into a built-in recording medium such as a hard disk.

Additionally, various types of processing described in the description may be not only chronologically performed according to description but also performed in parallel or individually according to processing capability of a device that performs the processing or as necessary. In addition, in the present description, a system is a set of logical components of a plurality of devices and it does not matter whether or not all the components are arranged in a single housing.

INDUSTRIAL APPLICABILITY

As described above, the configuration of an example of the present disclosure achieves an information processing device and a method that efficiently create a guide route satisfying route conditions entered by a user.

Specifically, for example, a guide route creation unit is provided to create a guide route for guidance provided by a robot, the guide route including a plurality of nodes and paths connecting the nodes. The guide route creation unit retrieves node attributes such as a value, an evaluation value, a guidance time, and a guidance target that are set for the nodes in the guidance route creation region, and path attributes such as a distance of each path and a moving time, and creates a guide route satisfying the route conditions entered by the user.

This configuration achieves an information processing device and a method that efficiently create a guide route satisfying the route conditions entered by the user.

REFERENCE SIGNS LIST

10 Robot
20 Visitor
30 Exhibit
50 Guide route
100 Information processing device
101 UI unit (input unit & display unit)
110 Data processing unit
111 Node-attribute definition generation unit
112 Path-attribute definition generation unit
113 Node attribute setting unit

114 Path attribute setting unit
115 Guide route creation unit
120 Node/path information storage unit
121 Node-attribute definition storage unit
122 Path-attribute definition storage unit
123 Node attribute storage unit
124 Path attribute storage unit
130 Region information storage unit
131 Map information
132 exhibit content information
133 Region-specific schedule information
140 Communication unit
200 External device
301 CPU
302 ROM
303 RAM
304 Bus
305 Input/output interface
306 Input unit
307 Output unit
308 Storage unit
309 Communication unit
310 Drive
311 Removable medium

What is claimed is:

1. An information processing device, comprising:
a storage unit configured to store each of:
a plurality of node attributes associated with a plurality of nodes, and
a plurality of path attributes associated with a plurality of paths, wherein
the plurality of paths connects the plurality of nodes, and
the plurality of nodes and the plurality of paths are in a guide route creation region of a map:
an input unit configured to:
receive a first user input that includes node attribute information, wherein
the node attribute information indicates a change in a node attribute of the plurality of node attributes, and
the node attribute is associated with a node of the plurality of nodes; and
receive a second user input that indicates a plurality of route conditions;
a node attribute setting unit configured to update, based on the node attribute information, the node attribute of the plurality of node attributes;
a guide route creation unit configured to:
retrieve, from the storage unit, the plurality of node attributes and the plurality of path attributes, wherein the retrieved plurality of node attributes includes the updated node attribute; and
generate a guide route that satisfies the plurality of route conditions based on each of:
the second user input,
the retrieved plurality of node attributes, and
the retrieved plurality of path attributes, wherein the guide route includes a set of nodes of the plurality of nodes and a set of paths of the plurality of paths; and
a communication unit configured to transmit the guide route to a robot, wherein the robot outputs guidance based on the guide route.

2. The information processing device according to claim 1, wherein
each node attribute of the plurality of node attributes includes at least one of:
a value set associated with a corresponding node of the plurality of nodes,
an evaluation value associated with the corresponding node,
a guidance time associated with the corresponding node, or
a target of the guidance associated with the corresponding node, and the guide route creation unit is further configured to:
compare the at least one of the value set, the evaluation value, the guidance time, or the target of the guidance with the plurality of route conditions; and
generate the guide route that satisfies the plurality of route conditions based on the comparison of the at least one of the value set, the evaluation value, the guidance time, or the target of the guidance with the plurality of route conditions.

3. The information processing device according to claim 1, wherein
each path attribute of the plurality of path attributes includes at least one of:
a path distance associated with a corresponding path of the plurality of paths,
a path moving time associated with the corresponding path, or
a moving means associated with the corresponding path, and
the guide route creation unit is further configured to:
compare the at least one of the path distance, the path moving time, or the moving means with the plurality of route conditions; and
generate the guide route that satisfies the plurality of route conditions based on the comparison of the at least one of the path distance, the path moving time, or the moving means with the plurality of route conditions.

4. The information processing device according to claim 1, wherein
each node attribute of the plurality of node attributes includes at least one of:
a node guidance charge associated with a corresponding node of the plurality of nodes,
a node stay time associated with the corresponding node,
a value of a node exhibit associated with the corresponding node,
a node satisfaction level associated with the corresponding node or
information of a person guidable to the corresponding node, and
the guide route creation unit is further configured to:
compare the at least one of the node guidance charge, the node stay time, the value of the node exhibit, the node satisfaction level, or the information of the person with the plurality of route conditions; and
generate the guide route that satisfies the plurality of route conditions based on the comparison of the at least one of the node guidance charge, the node stay time, the value of the node exhibit, the node satisfaction level, or the information of the person with the plurality of route conditions.

5. The information processing device according to claim 1, wherein
each node attribute of the plurality of node attributes includes at least one of;

sales of an item for sale associated with a corresponding node of the plurality of nodes, a value of an exhibit associated with the corresponding node, or one of a value of a sightseeing spot or a value of a scenery associated with the corresponding node, and the guide route creation unit is further configured to:

compare the at least one of the sales of the item, the value of the exhibit, or the one of the value of the sightseeing spot or the value of the scenery with the plurality of route conditions; and generate the guide route that satisfies the plurality of route conditions based on the comparison of the at least one of the sales of the item, the value of the exhibit, or the one of the value of the sightseeing spot or the value of the scenery with the plurality of route conditions.

6. The information processing device according to claim 1, wherein the plurality of route conditions includes at least two of:

a sum of charges for the guidance at the set of nodes, a sum of stay times at the set of nodes, a sum of values of exhibits at the set of nodes, or a mean value of satisfaction levels at the set of nodes.

7. The information processing device according to claim 1, further comprising a display unit, wherein the guide route creation unit is further configured to:

generate a plurality of guide routes that satisfies the plurality of route conditions, wherein the plurality of guide routes includes the guide route; and output list data of the generated plurality of guide routes to the display unit.

8. The information processing device according to claim 1, wherein in a case where a number of guide routes that satisfies the plurality of route conditions is smaller than a threshold value, the guide route creation unit is further configured to:

relax the plurality of route conditions; and generate a plurality of guide routes that satisfies the relaxed plurality of route conditions, and the plurality of guide routes includes the guide route.

9. The information processing device according to claim 1, wherein the storage unit includes:

a node attribute storage unit configured to store the plurality of node attributes associated with the plurality of nodes; and a path attribute storage unit configured to store the plurality of path attributes associated with the plurality of paths.

10. The information processing device according to claim 1, further comprising:

a node-attribute definition generation unit configured to:

generate node attribute definition information associated with the plurality of node attributes; and store the node attribute definition information in the storage unit; and a path-attribute definition generation unit configured to:

generate path attribute definition information associated with the plurality of path attributes; and store the path attribute definition information in the storage unit.

11. The information processing device according to claim 10, wherein the storage unit includes:

a node-attribute definition storage unit configured to store the generated node attribute definition information; and a path-attribute definition storage unit configured to store the generated path attribute definition information.

12. The information processing device according to claim 1, further comprising a path attribute setting unit, wherein the node attribute setting unit is further configured to:

set the plurality of node attributes; and store the set plurality of node attributes in the storage unit, each node attribute of the stored plurality of node attributes is associated with a respective node of the plurality of nodes, the path attribute setting unit is configured to:

set the plurality of path attributes; and store the set plurality of path attributes in the storage unit, and each path attribute of the stored plurality of path attributes is associated with a respective path of the plurality of paths.

13. The information processing device according to claim 12, wherein the storage unit includes:

a node attribute storage unit configured to store the set plurality of node attributes; and a path attribute storage unit configured to store the set plurality of path attributes.

14. An information processing method, the information processing method comprising:

in an information processing device that includes a storage unit, an input unit, a node attribute setting unit, a guide route creation unit, and a communication unit:

storing, by the storage unit, each of:

a plurality of node attributes associated with a plurality of nodes, and a plurality of path attributes associated with a plurality of paths wherein the plurality of paths connects the plurality of nodes, and the plurality of nodes and the plurality of paths are in a guide route creation region of a map;

receiving, by the input unit, a first user input that includes node attribute information, wherein the node attribute information indicates a change in a node attribute of the plurality of node attributes, and the node attribute is associated with a node of the plurality of nodes:

receiving, by the input unit, a second user input that indicates a plurality of route conditions;

updating, by the node attribute setting unit, the node attribute of the plurality of node attributes based on the node attribute information;

retrieving, by the guide route creation unit, the plurality of node attributes and the plurality of path attributes from the storage unit, wherein the retrieved plurality of node attributes includes the updated node attribute;

generating, by the guide route creation unit, a guide route that satisfies the plurality of route conditions based on each of:

the second user input, the retrieved plurality of node attributes, and the retrieved plurality of path attributes, wherein the guide route includes a set of nodes of the plurality of nodes and a set of paths of the plurality of paths; and transmitting, by the communication unit, the guide route to a robot, wherein the robot outputs guidance based on the guide route.

15. A non-transitory computer-readable medium having stored thereon computer-executable instructions that, when executed by a processor, cause the processor to execute operations, the operations comprising:

storing, in a storage unit, each of:

a plurality of node attributes associated with a plurality of nodes, and a plurality of path attributes associated with a plurality of paths, wherein the plurality of paths connects the plurality of nodes, and the plurality of nodes and the plurality of paths are in a guide route creation region of a map;

receiving a first user input that includes node attribute information, wherein the node attribute information indicates a change in a node attribute of the plurality of node attributes, and the node attribute is associated with a node of the plurality of nodes;

receiving a second user input that indicates a plurality of route conditions;

updating the node attribute of the plurality of node attributes based on the node attribute information;

retrieving the plurality of node attributes and the plurality of path attributes from the storage unit, wherein the retrieved plurality of node attributes includes the updated node attribute;

generating a guide route that satisfies the plurality of route conditions based on each of:

the second user input, the retrieved plurality of node attributes, and the retrieved plurality of path attributes, wherein the guide route includes a set of nodes of the plurality of nodes and a set of paths of the plurality of paths; and transmitting the guide route to a robot, wherein the robot outputs guidance based on the guide route.

* * * * *